US012350225B2

(12) United States Patent
Komatsu et al.

(10) Patent No.: US 12,350,225 B2
(45) **Date of Patent: *Jul. 8, 2025**

(54) APPARATUS FOR FALL PREVENTION DURING WALKING, CONTROL DEVICE, CONTROL METHOD, AND RECORDING MEDIUM

(71) Applicant: Panasonic Intellectual Property Management Co., Ltd., Osaka (JP)

(72) Inventors: Mayumi Komatsu, Kyoto (JP); Stephen William John, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 988 days.

This patent is subject to a terminal disclaimer.

(21) Appl. No.: 17/330,886

(22) Filed: May 26, 2021

(65) Prior Publication Data

US 2021/0290472 A1 Sep. 23, 2021

Related U.S. Application Data

(63) Continuation of application No. 16/057,854, filed on Aug. 8, 2018, now Pat. No. 11,071,674, which is a (Continued)

(30) Foreign Application Priority Data

Jan. 19, 2017 (JP) ................................ 2017-007812
Nov. 8, 2017 (JP) ................................ 2017-215379

(51) Int. Cl.
*A61H 3/00* (2006.01)
*A61H 1/02* (2006.01)

(52) U.S. Cl.
CPC ............ *A61H 3/00* (2013.01); *A61H 1/0237* (2013.01); *A61H 1/024* (2013.01); *A61H 1/0244* (2013.01);
(Continued)

(58) Field of Classification Search
CPC .......... A61H 1/00; A61H 1/02; A61H 1/0237; A61H 1/024; A61H 1/0244; A61H 1/0255;
(Continued)

(56) References Cited

U.S. PATENT DOCUMENTS 4,688,559 A 8/1987 Vito
5,501,656 A 3/1996 Homma
(Continued)

FOREIGN PATENT DOCUMENTS

CN 205521410 8/2016
JP 2007-307216 11/2007
(Continued)

OTHER PUBLICATIONS

International Search Report of PCT application No. PCT/JP2018/000606 dated Feb. 20, 2018.
(Continued)

*Primary Examiner* — Colin W Stuart
(74) *Attorney, Agent, or Firm* — Wenderoth, Lind & Ponack, L.L.P.

(57) ABSTRACT

An apparatus includes a first wire and a second wire which are coupled to a right upper ankle belt and a right lower ankle belt, a third wire and a fourth wire which are coupled to a left upper ankle belt and a left lower ankle belt, an obtainer obtaining user information about a user and information about walking action of the user, and a controller controlling tensions of the first wire and the second wire at the same time and controlling tensions of the third wire and
(Continued)

the fourth wire at the same time using a first stiffness target value corresponding to the first wire, a second stiffness target value corresponding to the second wire, a third stiffness target value corresponding to the third wire, and a fourth stiffness target value corresponding to the fourth wire that are determined based on the user information and the walk information.

13 Claims, 25 Drawing Sheets

Related U.S. Application Data continuation of application No. PCT/JP2018/000606, filed on Jan. 12, 2018.

(52) U.S. Cl.
CPC ......... *A61H 1/0262* (2013.01); *A61H 1/0266* (2013.01); *A61H 2003/007* (2013.01); *A61H 2201/0173* (2013.01); *A61H 2201/1215* (2013.01); *A61H 2201/149* (2013.01); *A61H 2201/163* (2013.01); *A61H 2201/1642* (2013.01); *A61H 2201/1652* (2013.01); *A61H 2201/5002* (2013.01); *A61H 2201/5007* (2013.01); *A61H 2201/5058* (2013.01); *A61H 2201/5071* (2013.01)

(58) Field of Classification Search
CPC ...... A61H 1/0262; A61H 1/0266; A61H 3/00; A61H 2201/0173; A61H 2201/1215; A61H 2201/1628; A61H 2201/164; A61H 2201/1642; A61H 2201/165; A61H 2201/1657; A61H 2201/1671; A61H 2201/50; A61H 2201/5005; A61H 2201/5007; A61H 2201/5053; A61H 2201/5058; A61H 2201/5061; A61H 2201/5071; A61H 2230/62; A61H 2230/625; A61F 5/04; A61F 5/05841; A61F 5/0585; A61F 5/01; A61F 5/0102; A61F 5/0123; A61F 5/0127; A61F 2/50
See application file for complete search history.

(56) References Cited

U.S. PATENT DOCUMENTS

| | | | |
|---|---|---|---|
| 5,865,770 | A | 2/1999 | Schectman |
| 6,213,922 | B1 | 4/2001 | Afanasenko |
| 2003/0092545 | A1 | 5/2003 | Koscielny |
| 2003/0120183 | A1 | 6/2003 | Simmons |
| 2010/0113987 | A1 | 5/2010 | Agrawal |
| 2011/0224586 | A1 | 9/2011 | Ikeuchi |
| 2014/0277739 | A1 | 9/2014 | Kornbluh et al. |
| 2018/0064560 | A1 | 3/2018 | Choi |

FOREIGN PATENT DOCUMENTS

| | | |
|---|---|---|
| JP | 2010-131382 | 6/2010 |
| JP | 2015-002970 | 1/2015 |

OTHER PUBLICATIONS

Extended European Search Report issued Nov. 13, 2019 in corresponding European Patent Application No. 18740999.0.
English Translation of Chinese Search Report dated May 8, 2021 for the related Chinese Patent Application No. 201880000762.8.

FIG. 9A

| AGE OF USER | RIGHT-FOOT POINT | LEFT-FOOT POINT |
|---|---|---|
| 39 OR LESS | 10 | 10 |
| 40s | 15 | 15 |
| 50s | 20 | 20 |
| 60s | 25 | 25 |
| 70s | 30 | 30 |
| 80 OR MORE | 50 | 50 |

FIG. 9B

| WALKING DIFFICULTIES | RIGHT-FOOT POINT | LEFT-FOOT POINT |
|---|---|---|
| RIGHT FOOT ONLY | 50 | 0 |
| LEFT FOOT ONLY | 0 | 50 |
| BOTH FEET | 50 | 50 |
| NO PARTICULAR DIFFICULTY | 0 | 0 |

FIG. 9C

| INPUT FATIGUE LEVEL | RIGHT-FOOT POINT | LEFT-FOOT POINT |
|---|---|---|
| NOT HARD | 0 | 0 |
| SOMEWHAT HARD | 15 | 15 |
| VERY HARD TO WALK | 25 | 25 |

FIG. 9D

| FATIGUE LEVEL p OVER TIME | RIGHT-FOOT POINT | LEFT-FOOT POINT |
|---|---|---|
| $p < 5$ | 0 | 0 |
| $5 \leq p < 25$ | 10 | 10 |
| $25 \leq p$ | 20 | 20 |

FIG. 9E

| TOTAL POINT Pt | ASSISTANCE STRENGTH |
|---|---|
| $Pt < 20$ | 1 |
| $20 \leq Pt < 50$ | 2 |
| $50 \leq Pt < 80$ | 3 |
| $80 \leq Pt$ | 4 |

FIG. 10

| GAIT CYCLE | RIGHT FOOT | LEFT FOOT |
|---|---|---|
| 0% | Up | Up |
| 10% | Up | Up |
| 48% | Up | Up |
| 60% | Down | Down |
| 98% | Up | Up |

FIG. 11

| ASSISTANCE STRENGTH | INCREASE TIME | DECREASE TIME |
|---|---|---|
| 1 | 20 | 10 |
| 2 | 30 | 10 |
| 3 | 50 | 10 |
| 4 | 80 | 5 |

APPARATUS FOR FALL PREVENTION DURING WALKING, CONTROL DEVICE, CONTROL METHOD, AND RECORDING MEDIUM

BACKGROUND

1. Technical Field

The present disclosure relates to an apparatus for fall prevention during walking, which is worn by a user to prevent the user from falling in their left-right direction when the user is walking, a control device, a control method, and a recording medium.

2. Description of the Related Art

Devices called assist devices that people wear for the purposes of power assistance, assisting the elderly or mobility impaired persons in their activities, rehabilitation support, or the like have been intensively developed in recent years. Such devices work when persons wear them, and thus highly human-friendly activity methods are demanded. It is commonly known that when a person moves their joints, torques of the joints necessary for actions are generated and at the same time antagonistic muscles cause changes in stiffness. Thus, a method that uses a member capable of appropriately setting stiffnesses to be transmitted to the body of a person is known as a highly human-friendly activity method (see, for example, Japanese Unexamined Patent Application Publication No. 2015-2970 and Japanese Patent No. 5259553).

SUMMARY

In particular, when a device assists a person wearing the device in walking, the device is desirably capable of preventing the person from falling not only in the forward-backward direction, which is the walking direction, but also in the transverse direction, i.e., falling to the left and right, in order to allow the person to continue walking safely.

However, many typical assist devices assume only an assistance method in a direction in which assistance is necessary, namely, in the forward-backward direction in the case of walking.

One non-limiting and exemplary embodiment provides an apparatus for fall prevention during walking, which can prevent a user from falling to the left and falling to the right during walking, a control device, a control method, and a recording medium.

In one general aspect, the techniques disclosed here feature an apparatus for fall prevention during walking, including a left upper ankle belt to be fixed on an upper part of a left ankle of a user, a right upper ankle belt to be fixed on an upper part of a right ankle of the user, a left lower ankle belt to be fixed on a lower part of the left ankle of the user, a right lower ankle belt to be fixed on a lower part of the right ankle of the user, a first wire coupled to the right upper ankle belt and the right lower ankle belt, a second wire coupled to the right upper ankle belt and the right lower ankle belt, at least a portion of the first wire being located along a right side surface of the right ankle, at least a portion of the second wire being located along a left side surface of the right ankle, a third wire coupled to the left upper ankle belt and the left lower ankle belt, a fourth wire coupled to the left upper ankle belt and the left lower ankle belt, at least a portion of the third wire being located along a right side surface of the left ankle, at least a portion of the fourth wire being located along a left side surface of the left ankle, a first tension controller that controls a tension of the first wire, a second tension controller that controls a tension of the second wire, a third tension controller that controls a tension of the third wire, a fourth tension controller that controls a tension of the fourth wire, an obtainer that obtains user information about the user and walk information about walking action of the user, and a controller, wherein the controller determines, based on the user information and the walk information, a first stiffness target value of the first wire, a second stiffness target value of the second wire, a third stiffness target value of the third wire, and a fourth stiffness target value of the fourth wire, the controller causes the first tension controller to control the tension of the first wire using the first stiffness target value, the controller causes the second tension controller to control the tension of the second wire using the second stiffness target value, the controller causes the third tension controller to control the tension of the third wire using the third stiffness target value, the controller causes the fourth tension controller to control the tension of the fourth wire using the fourth stiffness target value, the tension of the first wire and the tension of the second wire are controlled at a same time, and the tension of the third wire and the tension of the fourth wire are controlled at a same time.

According to the present disclosure, it is possible to prevent a user from falling to the left or falling to the right during walking on the basis of user information and road surface information. Additional benefits and advantages of an aspect of the present disclosure will become apparent from the specification and drawings. The benefits and/or advantages may be individually provided by various aspects and features disclosed in the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3C is a side view of the example of the tension application mechanism of the apparatus for fall prevention during walking, illustrating the configuration thereof with a pulley, a wire, a motor, and so on;

FIG. 9A is a diagram illustrating an example of the operation of an assistance strength determination unit in the embodiment of the present disclosure;

FIG. 9B is a diagram illustrating an example of the operation of the assistance strength determination unit in the embodiment of the present disclosure;

FIG. 9C is a diagram illustrating an example of the operation of the assistance strength determination unit in the embodiment of the present disclosure;

FIG. 9D is a diagram illustrating an example of the operation of the assistance strength determination unit in the embodiment of the present disclosure;

FIG. 9E is a diagram illustrating an example of the operation of the assistance strength determination unit in the embodiment of the present disclosure;

FIG. 10 is a diagram illustrating an example of the operation of a timing determination unit in the embodiment of the present disclosure;

FIG. 11 is a diagram illustrating an example of the operation of a stiffness target value output unit in the embodiment of the present disclosure;

DETAILED DESCRIPTION

Figure 1A:
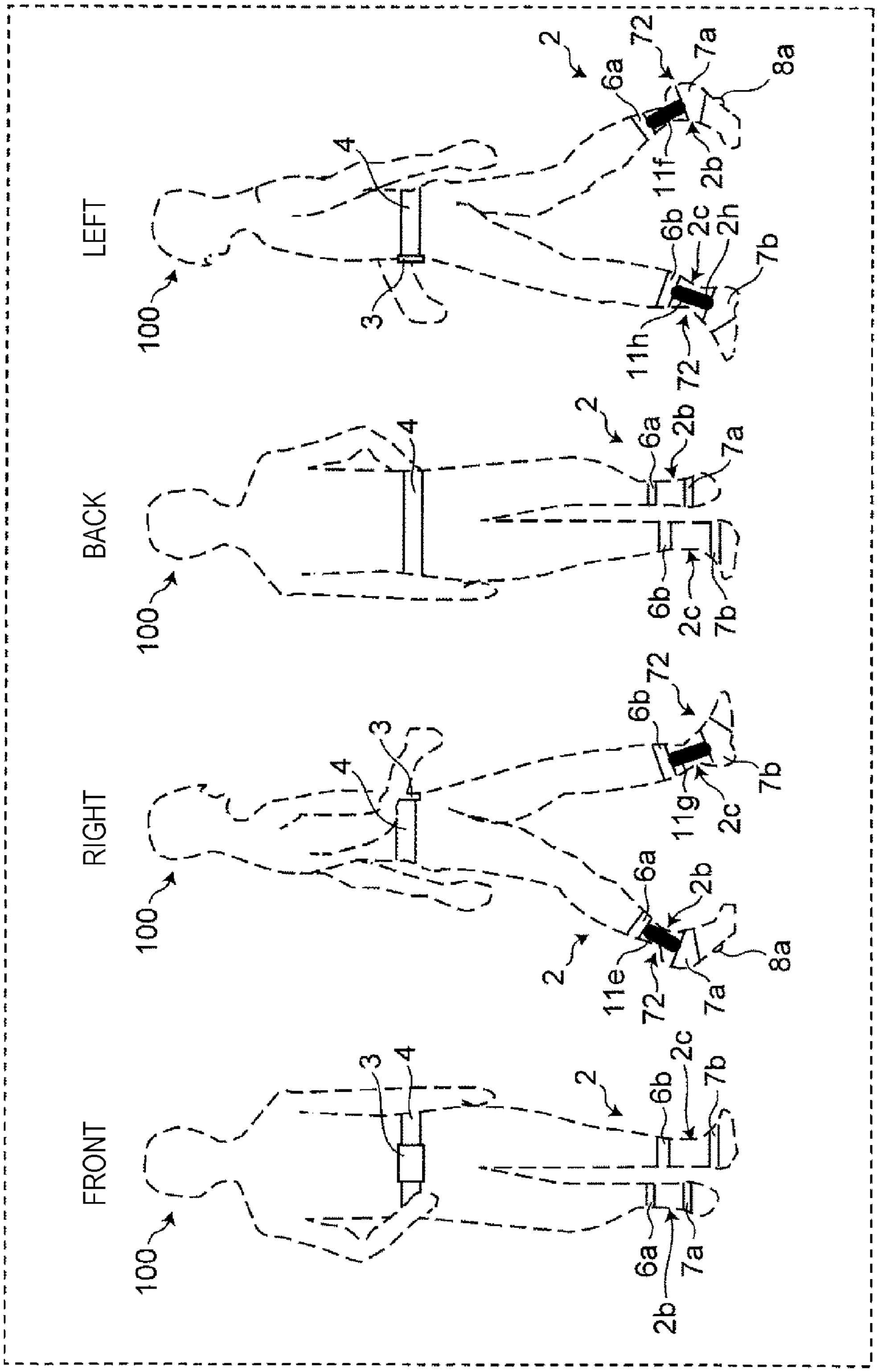
FIG. 1A is a diagram illustrating the arrangement of upper ankle belts, lower ankle belts, and wires as a first example of an assist garment that is an apparatus for fall prevention during walking in an embodiment of the present disclosure.

The following describes an embodiment of the present disclosure in detail with reference to the drawings.

The following describes a variety of aspects of the present disclosure before describing an embodiment of the present disclosure in detail with reference to the drawings.

A first aspect of the present disclosure provides an apparatus for fall prevention during walking, including a left upper ankle belt to be fixed on an upper part of a left ankle of a user, a right upper ankle belt to be fixed on an upper part of a right ankle of the user, a left lower ankle belt to be fixed on a lower part of the left ankle of the user, a right lower ankle belt to be fixed on a lower part of the right ankle of the user, a first wire coupled to the right upper ankle belt and the right lower ankle belt, a second wire coupled to the right upper ankle belt and the right lower ankle belt, at least a portion of the first wire being located along a right side surface of the right ankle, at least a portion of the second wire being located along a left side surface of the right ankle, a third wire coupled to the left upper ankle belt and the left lower ankle belt, a fourth wire coupled to the left upper ankle belt and the left lower ankle belt, at least a portion of the third wire being located along a right side surface of the left ankle, at least a portion of the fourth wire being located along a left side surface of the left ankle, a first tension controller that controls a tension of the first wire, a second tension controller that controls a tension of the second wire, a third tension controller that controls a tension of the third wire, a fourth tension controller that controls a tension of the fourth wire, an obtainer that obtains user information about the user and walk information about walking action of the user, and a controller, wherein the controller determines, based on the user information and the walk information, a first stiffness target value of the first wire, a second stiffness target value of the second wire, a third stiffness target value of the third wire, and a fourth stiffness target value of the fourth wire, the controller causes the first tension controller to control the tension of the first wire using the first stiffness target value, the controller causes the second tension controller to control the tension of the second wire using the second stiffness target value, the controller causes the third tension controller to control the tension of the third wire using the third stiffness target value, the controller causes the fourth tension controller to control the tension of the fourth wire using the fourth stiffness target value, the tension of the first wire and the tension of the second wire are controlled at a same time, and the tension of the third wire and the tension of the fourth wire are controlled at a same time.

According to the first aspect, the tension of each wire is controlled by using a stiffness target value based on user information and walk information. Thus, the user can be prevented from falling to the left and falling to the right during walking.

A second aspect of the present disclosure provides the apparatus for fall prevention during walking according to the first aspect, in which the first tension controller the first tension controller includes a first motor having a first rotating shaft to which the first wire is coupled, the first motor controlling rotation of the first rotating shaft to thereby control the tension of the first wire, the second tension controller includes a second motor having a second rotating shaft to which the second wire is coupled, the second motor controlling rotation of the second rotating shaft to thereby control the tension of the second wire, the third tension controller includes a third motor having a third rotating shaft to which the third wire is coupled, the third motor controlling rotation of the third rotating shaft to thereby control the tension of the third wire, the fourth tension controller includes a fourth motor having a fourth rotating shaft to which the fourth wire is coupled, the fourth motor controlling rotation of the fourth rotating shaft to thereby control the tension of the fourth wire, and the controller instructs the first motor to control the rotation of the first rotating shaft, instructs the second motor to control the rotation of the second rotating shaft, instructs the third motor to control the rotation of the third rotating shaft, and instructs the fourth motor to control the rotation of the fourth rotating shaft.

According to the second aspect, each tension controller is a motor that controls a tension of a corresponding one of the wires. Thus, the motors can cause the corresponding wires to generate tensions proportional to the amounts of change in length in a manner similar to that of springs, thereby preventing the user from falling in their left-right direction during walking.

A third aspect of the present disclosure provides the apparatus for fall prevention during walking according to the first aspect, in which the apparatus for fall prevention during walking further includes a waist belt to be fixed on a waist of the user, a left above-knee belt to be fixed above a knee of a left leg of the user, a right above-knee belt to be fixed above a knee of a right leg of the user, a fifth wire coupled to the waist belt and the right above-knee belt, a sixth wire coupled to the waist belt and the right above-knee belt, a seventh wire coupled to the waist belt and the left above-knee belt, an eighth wire coupled to the waist belt and the left above-knee belt, at least a portion of the fifth wire being located on a right side surface of a right thigh of the user, at least a portion of the sixth wire being located on a left side surface of the right thigh, at least a portion of the seventh wire being located on a right side surface of a left thigh of the user, at least a portion of the eighth wire being located on a left side surface of the left thigh, a fifth tension controller that controls a tension of the fifth wire, a sixth tension controller that controls a tension of the sixth wire, a seventh tension controller that controls a tension of the seventh wire, and an eighth tension controller that controls a tension of the eighth wire; the controller determines, based on the user information and the walk information, a fifth stiffness target value of the fifth wire, a sixth stiffness target value of the sixth wire, a seventh stiffness target value of the seventh wire, and an eighth stiffness target value of the eighth wire; the controller causes the fifth tension controller to control the tension of the fifth wire using the fifth stiffness target value; the controller causes the sixth tension controller to control the tension of the sixth wire using the sixth stiffness target value; the controller causes the seventh tension controller to control the tension of the seventh wire using the seventh stiffness target value; the controller causes the eighth tension controller to control the tension of the eighth wire using the eighth stiffness target value; the tension of the fifth wire and the tension of the sixth wire are controlled at a same time; and the tension of the seventh wire and the tension of the eighth wire are controlled at a same time.

According to the third aspect, the tension of each wire is controlled by using a stiffness target value based on user information and walk information. Thus, the user can be prevented from falling to the left and falling to the right during walking.

A fourth aspect of the present disclosure provides the apparatus for fall prevention during walking according to the third aspect, in which the fifth tension controller includes a fifth motor having a fifth rotating shaft to which the fifth wire is coupled, the fifth motor controlling rotation of the fifth rotating shaft to thereby control the tension of the fifth wire, the sixth tension controller includes a sixth motor having a sixth rotating shaft to which the sixth wire is coupled, the sixth motor controlling rotation of the sixth rotating shaft to thereby control the tension of the sixth wire, the seventh tension controller includes a seventh motor having a seventh rotating shaft to which the seventh wire is coupled, the seventh motor controlling rotation of the seventh rotating shaft to thereby control the tension of the seventh wire, the eighth tension controller includes an eighth motor having an eighth rotating shaft to which the eighth wire is coupled, the eighth motor controlling rotation of the eighth rotating shaft to thereby control the tension of the eighth wire, and the controller instructs the fifth tension controller to control the rotation of the fifth rotating shaft, instructs the sixth tension controller to control the rotation of the sixth rotating shaft, instructs the seventh tension controller to control the rotation of the seventh rotating shaft, and instructs the eighth tension controller to control the rotation of the eighth rotating shaft.

According to the fourth aspect, each tension controller is a motor that controls a tension of a corresponding one of the wires. Thus, the motors can cause the corresponding wires to generate tensions proportional to the amounts of change in length in a manner similar to that of springs, thereby preventing the user from falling to the left and falling to the right during walking.

A fifth aspect of the present disclosure provides an apparatus for fall prevention during walking, including a waist belt to be fixed on a waist of a user, a left above-knee belt to be fixed above a knee of a left leg of the user, a right above-knee belt to be fixed above a knee of a right leg of the user, a fifth wire coupled to the waist belt and the right above-knee belt, a sixth wire coupled to the waist belt and the right above-knee belt, a seventh wire coupled to the waist belt and the left above-knee belt, an eighth wire coupled to the waist belt and the left above-knee belt, at least a portion of the fifth wire being located along a right side surface of a right thigh of the user, at least a portion of the sixth wire being located along a left side surface of the right thigh, at least a portion of the seventh wire being located along a right side surface of a left thigh of the user, at least a portion of the eighth wire being located along a left side surface of the left thigh, a fifth tension controller that controls a tension of the fifth wire, a sixth tension controller that controls a tension of the sixth wire, a seventh tension controller that controls a tension of the seventh wire, an eighth tension controller that controls a tension of the eighth wire, an obtainer that obtains user information about the user and walk information about walking action of the user, and a controller, wherein the controller determines, based on the user information and the walk information, a fifth stiffness target value of the fifth wire, a sixth stiffness target value of the sixth wire, a seventh stiffness target value of the seventh wire, and an eighth stiffness target value of the eighth wire, the controller causes the fifth tension controller to control the tension of the fifth wire using the fifth stiffness target value, the controller causes the sixth tension controller to control the tension of the sixth wire using the sixth stiffness target value, the controller causes the seventh tension controller to control the tension of the seventh wire using the seventh stiffness target value, the controller causes the eighth tension controller to control the tension of the eighth wire using the eighth stiffness target value, the tension of the fifth wire and the tension of the sixth wire are controlled at a same time, and the tension of the seventh wire and the tension of the eighth wire are controlled at a same time.

According to the fifth aspect, the tension of each wire is controlled by using a stiffness target value based on user information and walk information. Thus, the user can be prevented from falling to the left and falling to the right during walking.

A sixth aspect of the present disclosure provides the apparatus for fall prevention during walking according to the fifth aspect, in which the fifth tension controller includes a fifth motor having a fifth rotating shaft to which the fifth wire is coupled, the fifth motor controlling rotation of the fifth rotating shaft to thereby control the tension of the fifth wire, the sixth tension controller includes a sixth motor having a sixth rotating shaft to which the sixth wire is coupled, the sixth motor controlling rotation of the sixth rotating shaft to thereby control the tension of the sixth wire, the seventh tension controller includes a seventh motor having a seventh rotating shaft to which the seventh wire is coupled, the seventh motor controlling rotation of the seventh rotating shaft to thereby control the tension of the seventh wire, the eighth tension controller includes an eighth motor having an eighth rotating shaft to which the eighth wire is coupled, the eighth motor controlling rotation of the eighth rotating shaft to thereby control the tension of the eighth wire, and the controller instructs the fifth tension controller to control the rotation of the fifth rotating shaft, instructs the sixth tension controller to control the rotation of the sixth rotating shaft, instructs the seventh tension controller to control the rotation of the seventh rotating shaft, and instructs the eighth tension controller to control the rotation of the eighth rotating shaft.

According to the sixth aspect, each tension controller is a motor that controls a tension of a corresponding one of the wires. Thus, the motors can cause the corresponding wires to generate tensions proportional to the amounts of change in length in a manner similar to that of springs, thereby preventing the user from falling to the left and falling to the right during walking.

A seventh aspect of the present disclosure provides the apparatus for fall prevention during walking according to the third or fourth aspect, in which the first stiffness target value is equal to the second stiffness target value and the third stiffness target value is equal to the fourth stiffness target value, and the fifth stiffness target value is equal to the sixth stiffness target value and the seventh stiffness target value is equal to the eighth stiffness target value.

An eighth aspect of the present disclosure provides the apparatus for fall prevention during walking according to the third or fourth aspect, in which the controller (i) provides an instruction to control the rotation of the first rotating shaft on the basis of a force generated in the first wire, provides an instruction to control the rotation of the second rotating shaft on the basis of a force generated in the second wire, provides an instruction to control the rotation of the third rotating shaft on the basis of a force generated in the third wire, provides an instruction to control the rotation of the fourth rotating shaft on the basis of a force generated in the fourth wire, provides an instruction to control the rotation of the fifth rotating shaft on the basis of a force generated in the fifth wire, provides an instruction to control the rotation of the sixth rotating shaft on the basis of a force generated in the sixth wire, provides an instruction to control the rotation of the seventh rotating shaft on the basis of a force generated in the seventh wire, and provides an instruction to control the rotation of the eighth rotating shaft on the basis of a force generated in the eighth wire, or (ii) provides an instruction to control the rotation of the first rotating shaft on the basis of a length of the first wire, provides an instruction to control the rotation of the second rotating shaft on the basis of a length of the second wire, provides an instruction to control the rotation of the third rotating shaft on the basis of a length of the third wire, provides an instruction to control the rotation of the fourth rotating shaft on the basis of a length of the fourth wire, provides an instruction to control the rotation of the fifth rotating shaft on the basis of a length of the fifth wire, provides an instruction to control the rotation of the sixth rotating shaft on the basis of a length of the sixth wire, provides an instruction to control the rotation of the seventh rotating shaft on the basis of a length of the seventh wire, and provides an instruction to control the rotation of the eighth rotating shaft on the basis of a length of the eighth wire.

A ninth aspect of the present disclosure provides the apparatus for fall prevention during walking according to the third or fourth aspect, in which the obtainer obtains, as the user information, at least one of information concerning an age of the user, information indicating whether the user has an injured or impaired leg, and information indicating a degree of fatigue of the user, and the controller changes each of the first stiffness target value, the second stiffness target value, the third stiffness target value, the fourth stiffness target value, the fifth stiffness target value, the sixth stiffness target value, the seventh stiffness target value, and the eighth stiffness target value to a larger value as the age increases, changes each of the first stiffness target value, the second stiffness target value, the third stiffness target value, the fourth stiffness target value, the fifth stiffness target value, the sixth stiffness target value, the seventh stiffness target value, and the eighth stiffness target value to a larger value if the user has an injured or impaired leg, and changes each of the first stiffness target value, the second stiffness target value, the third stiffness target value, the fourth stiffness target value, the fifth stiffness target value, the sixth stiffness target value, the seventh stiffness target value, and the eighth stiffness target value to a larger value as the degree of fatigue increases.

According to the ninth aspect, a fall prevention effect suitable for each user can be achieved.

A tenth aspect of the present disclosure provides the apparatus for fall prevention during walking according to the third or fourth aspect, in which the walk information includes a fatigue level of the user over time based on a first fatigue level point and a second fatigue level point, the second fatigue level point is determined on the basis of a walking time that is a time interval from when the user starts walking to a current time, the first fatigue level point increases when the number of walking steps within the predetermined time decreases as the walking time elapses, the second fatigue level point increases as the walking time increases, the fatigue level over time increases when the first fatigue level point increases, the fatigue level over time increases when the second fatigue level point increases, and the controller increases the first stiffness target value, the second stiffness target value, the third stiffness target value, the fourth stiffness target value, the fifth stiffness target value, the sixth stiffness target value, the seventh stiffness target value, and the eighth stiffness target value when the fatigue level over time is determined to be higher than a threshold.

According to the tenth aspect, if it is determined that the user is likely to fall due to a long walking time or large fatigue over time, the stiffness is enhanced, thereby enhancing the fall prevention effect.

An eleventh aspect of the present disclosure provides the apparatus for fall prevention during walking according to the third or fourth aspect, in which the obtainer includes a walk information obtaining device that obtains the walk information, and the controller controls, based on the walk information obtained by the walk information obtaining device, a timing for changing the first stiffness target value, the second stiffness target value, the third stiffness target value, the fourth stiffness target value, the fifth stiffness target value, the sixth stiffness target value, the seventh stiffness target value, and the eighth stiffness target value.

According to the eleventh aspect, the stiffness is enhanced at an appropriate timing, thereby enabling fall prevention without hindering normal walking.

A twelfth aspect of the present disclosure provides the apparatus for fall prevention during walking according to the eleventh aspect, in which the walk information is gait cycle information of the user, the gait cycle information includes time information about a time during which a right foot of the user is in contact with a walking surface within one gait cycle of the right foot, an eleventh stiffness target value is a stiffness target value obtained when the right foot is in contact with a contact surface and corresponds to the first stiffness target value, a twelfth stiffness target value is a stiffness target value obtained when the right foot is in contact with the contact surface and corresponds to the second stiffness target value, a fifteenth stiffness target value is a stiffness target value obtained when the right foot is in contact with the contact surface and corresponds to the fifth stiffness target value, a sixteenth stiffness target value is a stiffness target value obtained when the right foot is in contact with the contact surface and corresponds to the sixth stiffness target value, a twenty-first stiffness target value is a stiffness target value obtained when the right foot is not in contact with the contact surface and corresponds to the first stiffness target value, a twenty-second stiffness target value is a stiffness target value obtained when the right foot is not in contact with the contact surface and corresponds to the second stiffness target value, a twenty-fifth stiffness target value is a stiffness target value obtained when the right foot is not in contact with the contact surface and corresponds to the fifth stiffness target value, a twenty-sixth stiffness target value is a stiffness target value obtained when the right foot is not in contact with the contact surface and corresponds to the sixth stiffness target value, and the controller changes the first stiffness target value from the twenty-first stiffness target value to the eleventh stiffness target value, changes the second stiffness target value from the twenty-second stiffness target value to the twelfth stiffness target value, changes the fifth stiffness target value from the twenty-fifth stiffness target value to the fifteenth stiffness target value, and changes the sixth stiffness target value from the twenty-sixth stiffness target value to the sixteenth stiffness target value on the basis of the gait cycle information immediately before the right foot contacts the walking surface within a current gait cycle.

According to the twelfth aspect, when the leg of the user touches the contact surface, the left-right stiffness is increased from immediately before the contact, thereby achieving the fall prevention effect.

A thirteenth aspect of the present disclosure provides the apparatus for fall prevention during walking according to the eleventh aspect, in which the walk information about the user is gait cycle information of the user, and the stiffness control unit performs control to set a stiffness value to be larger than a stiffness value obtained before a predetermined period in a swing phase on the basis of the gait cycle information of the user before a predetermined time from an expected contact time.

According to the thirteenth aspect, when the leg of the user touches the contact surface, the stiffnesses to be transmitted to the user are increased from immediately before the contact, thereby achieving the fall prevention effect.

A fourteenth aspect of the present disclosure provides the apparatus for fall prevention during walking according to the twelfth aspect, in which the controller changes the first stiffness target value from the eleventh stiffness target value to the twenty-first stiffness target value, changes the second stiffness target value from the twelfth stiffness target value to the twenty-second stiffness target value, changes the fifth stiffness target value from the fifteenth stiffness target value to the twenty-fifth stiffness target value, and changes the sixth stiffness target value from the sixteenth stiffness target value to the twenty-sixth stiffness target value on the basis of the gait cycle information when the right foot is not in contact with the walking surface within the current gait cycle.

According to the fourteenth aspect, when a foot of the user is away from the contact surface, the stiffnesses to be transmitted to the user are reduced, thereby preventing hindrance to the mobility of joints of the leg. When the leg of the user touches the contact surface, the left-right stiffness is increased from immediately before the contact, thereby achieving the fall prevention effect.

A fifteenth aspect of the present disclosure provides a control device for an apparatus including belts and wires, the belts including a left upper ankle belt to be fixed on an upper part of a left ankle of a user, a right upper ankle belt to be fixed on an upper part of a right ankle of the user, a left lower ankle belt to be fixed on a lower part of the left ankle of the user, and a right lower ankle belt to be fixed on a lower part of the right ankle of the user, the wires including a first wire coupled to the right upper ankle belt and the right lower ankle belt, a second wire coupled to the right upper ankle belt and the right lower ankle belt, a third wire coupled to the left upper ankle belt and the left lower ankle belt, and a fourth wire coupled to the left upper ankle belt and the left lower ankle belt, at least a portion of the first wire being located along a right side surface of the right ankle, at least a portion of the second wire being located along a left side surface of the right ankle, at least a portion of the third wire being located along a right side surface of the left ankle, at least a portion of the fourth wire being located along a left side surface of the left ankle, the control device including a first tension controller that controls a tension of the first wire, a second tension controller that controls a tension of the second wire, a third tension controller that controls a tension of the third wire, a fourth tension controller that controls a tension of the fourth wire, an obtainer that obtains user information about the user and walk information about walking action of the user, and a controller, wherein the controller determines, based on the user information and the walk information, a first stiffness target value of the first wire, a second stiffness target value of the second wire, a third stiffness target value of the third wire, and a fourth stiffness target value of the fourth wire, the controller causes the first tension controller to control the tension of the first wire using the first stiffness target value, the controller causes the second tension controller to control the tension of the second wire using the second stiffness target value, the controller causes the third tension controller to control the tension of the third wire using the third stiffness target value, the controller causes the fourth tension controller to control the tension of the fourth wire using the fourth stiffness target value, the tension of the first wire and the tension of the second wire are controlled at a same time, and the tension of the third wire and the tension of the fourth wire are controlled at a same time.

According to the fifteenth aspect, the tension of each wire is controlled by using a stiffness target value based on user information and walk information. Thus, the user can be prevented from falling to the left and falling to the right during walking.

A sixteenth aspect of the present disclosure provides a control device for an apparatus including belts and wires, the belts including a waist belt to be fixed on a waist of a user, a left above-knee belt to be fixed above a knee of a left leg of the user, and a right above-knee belt to be fixed above a knee of a right leg of the user, the wires including a fifth wire coupled to the waist belt and the right above-knee belt, a sixth wire coupled to the waist belt and the right above-knee belt, a seventh wire coupled to the waist belt and the left above-knee belt, and an eighth wire coupled to the waist belt and the left above-knee belt, at least a portion of the fifth wire being located on a right side surface of a right thigh of the user, at least a portion of the sixth wire being located on a left side surface of the right thigh, at least a portion of the seventh wire being located on a right side surface of a left thigh of the user, at least a portion of the eighth wire being located on a left side surface of the left thigh, the control device including a fifth tension controller that controls a tension of the fifth wire, a sixth tension controller that controls a tension of the sixth wire, a seventh tension controller that controls a tension of the seventh wire, an eighth tension controller that controls a tension of the eighth wire, an obtainer that obtains user information about the user and walk information about walking action of the user, and a controller, wherein the controller determines, based on the user information and the walk information, a fifth stiffness target value of the fifth wire, a sixth stiffness target value of the sixth wire, a seventh stiffness target value of the seventh wire, and an eighth stiffness target value of the eighth wire, the controller causes the fifth tension controller to control the tension of the fifth wire using the fifth stiffness target value, the controller causes the sixth tension controller to control the tension of the sixth wire using the sixth stiffness target value, the controller causes the seventh tension controller to control the tension of the seventh wire using the seventh stiffness target value, the controller causes the eighth tension controller to control the tension of the eighth wire using the eighth stiffness target value, the tension of the fifth wire and the tension of the sixth wire are controlled at a same time, and the tension of the seventh wire and the tension of the eighth wire are controlled at a same time.

According to the sixteenth aspect, the tension of each wire is controlled by using a stiffness target value based on user information and walk information. Thus, the user can be prevented from falling to the left and falling to the right during walking.

A seventeenth aspect of the present disclosure provides a control method for an apparatus including belts and wires, the belts including a left upper ankle belt to be fixed on an upper part of a left ankle of a user, a right upper ankle belt to be fixed on an upper part of a right ankle of the user, a left lower ankle belt to be fixed on a lower part of the left ankle of the user, and a right lower ankle belt to be fixed on a lower part of the right ankle of the user, the wires including a first wire coupled to the right upper ankle belt and the right lower ankle belt, a second wire coupled to the right upper ankle belt and the right lower ankle belt, a third wire coupled to the left upper ankle belt and the left lower ankle belt, and a fourth wire coupled to the left upper ankle belt and the left lower ankle belt, at least a portion of the first wire being located along a right side surface of the right ankle, at least a portion of the second wire being located along a left side surface of the right ankle, at least a portion of the third wire being located along a right side surface of the left ankle, at least a portion of the fourth wire being located along a left side surface of the left ankle, the control method includes obtaining user information about the user and walk information about walking action of the user; determining, based on the user information and the walk information, a first stiffness target value of the first wire, a second stiffness target value of the second wire, a third stiffness target value of the third wire, and a fourth stiffness target value of the fourth wire; controlling a tension of the first wire using the first stiffness target value; controlling a tension of the second wire using the second stiffness target value; controlling a tension of the third wire using the third stiffness target value; and controlling a tension of the fourth wire using the fourth stiffness target value, wherein the tension of the first wire and the tension of the second wire are controlled at a same time, and the tension of the third wire and the tension of the fourth wire are controlled at a same time.

According to the seventeenth aspect, the tension of each wire is controlled by using a stiffness target value based on user information and walk information. Thus, the user can be prevented from falling to the left and falling to the right during walking.

An eighteenth aspect of the present disclosure provides a control method for an apparatus including belts and wires, the belts including a waist belt to be fixed on a waist of a user, a left above-knee belt to be fixed above a knee of a left leg of the user, and a right above-knee belt to be fixed above a knee of a right leg of the user, the wires including a fifth wire coupled to the waist belt and the right above-knee belt, a sixth wire coupled to the waist belt and the right above-knee belt, a seventh wire coupled to the waist belt and the left above-knee belt, and an eighth wire coupled to the waist belt and the left above-knee belt, at least a portion of the fifth wire being located on a right side surface of a right thigh of the user, at least a portion of the sixth wire being located on a left side surface of the right thigh, at least a portion of the seventh wire being located on a right side surface of a left thigh of the user, at least a portion of the eighth wire being located on a left side surface of the left thigh, the control method including obtaining user information about the user and walk information about walking action of the user; determining, based on the user information and the walk information, a fifth stiffness target value of the fifth wire, a sixth stiffness target value of the sixth wire, a seventh stiffness target value of the seventh wire, and an eighth stiffness target value of the eighth wire; controlling a tension of the fifth wire using the fifth stiffness target value; controlling a tension of the sixth wire using the sixth stiffness target value; controlling a tension of the seventh wire using the seventh stiffness target value; and controlling a tension of the eighth wire using the eighth stiffness target value, wherein the tension of the fifth wire and the tension of the sixth wire are controlled at a same time, and the tension of the seventh wire and the tension of the eighth wire are controlled at a same time.

According to the eighteenth aspect, the tension of each wire is controlled by using a stiffness target value based on user information and walk information. Thus, the user can be prevented from falling to the left and falling to the right during walking.

A nineteenth aspect of the present disclosure provides a recording medium storing a program for causing a computer to execute a control method for an apparatus including belts and wires, the belts including a left upper ankle belt to be fixed on an upper part of a left ankle of a user, a right upper ankle belt to be fixed on an upper part of a right ankle of the user, a left lower ankle belt to be fixed on a lower part of the left ankle of the user, and a right lower ankle belt to be fixed on a lower part of the right ankle of the user, the wires including a first wire coupled to the right upper ankle belt and the right lower ankle belt, a second wire coupled to the right upper ankle belt and the right lower ankle belt, a third wire coupled to the left upper ankle belt and the left lower ankle belt, and a fourth wire coupled to the left upper ankle belt and the left lower ankle belt, at least a portion of the first wire being located along a right side surface of the right ankle, at least a portion of the second wire being located along a left side surface of the right ankle, at least a portion of the third wire being located along a right side surface of the left ankle, at least a portion of the fourth wire being located along a left side surface of the left ankle, the recording medium being a non-volatile computer-readable recording medium, the control method including obtaining user information about the user and walk information about walking action of the user; determining, based on the user information and the walk information, a first stiffness target value of the first wire, a second stiffness target value of the second wire, a third stiffness target value of the third wire, and a fourth stiffness target value of the fourth wire; controlling a tension of the first wire using the first stiffness target value; controlling a tension of the second wire using the second stiffness target value; controlling a tension of the third wire using the third stiffness target value; and controlling a tension of the fourth wire using the fourth stiffness target value, wherein the tension of the first wire and the tension of the second wire are controlled at a same time, and the tension of the third wire and the tension of the fourth wire are controlled at a same time.

According to the nineteenth aspect, the tension of each wire is controlled by using a stiffness target value based on user information and walk information. Thus, the user can be prevented from falling to the left and falling to the right during walking.

A twentieth aspect of the present disclosure provides a recording medium storing a program for causing a computer to execute a control method for an apparatus including belts and wires, the belts including a waist belt to be fixed on a waist of a user, a left above-knee belt to be fixed above a knee of a left leg of the user, and a right above-knee belt to be fixed above a knee of a right leg of the user, the wires including a fifth wire coupled to the waist belt and the right above-knee belt, a sixth wire coupled to the waist belt and the right above-knee belt, a seventh wire coupled to the waist belt and the left above-knee belt, and an eighth wire coupled to the waist belt and the left above-knee belt, at least a portion of the fifth wire being located on a right side surface of a right thigh of the user, at least a portion of the sixth wire being located on a left side surface of the right thigh, at least a portion of the seventh wire being located on a right side surface of a left thigh of the user, at least a portion of the eighth wire being located on a left side surface of the left thigh, the recording medium being a non-volatile computer-readable recording medium, the control method including obtaining user information about the user and walk information about walking action of the user; determining, based on the user information and the walk information, a fifth stiffness target value of the fifth wire, a sixth stiffness target value of the sixth wire, a seventh stiffness target value of the seventh wire, and an eighth stiffness target value of the eighth wire; controlling a tension of the fifth wire using the fifth stiffness target value; controlling a tension of the sixth wire using the sixth stiffness target value; controlling a tension of the seventh wire using the seventh stiffness target value; and controlling a tension of the eighth wire using the eighth stiffness target value, wherein the tension of the fifth wire and the tension of the sixth wire are controlled at a same time, and the tension of the seventh wire and the tension of the eighth wire are controlled at a same time.

According to the twentieth aspect, the tension of each wire is controlled by using a stiffness target value based on user information and walk information. Thus, the user can be prevented from falling to the left and falling to the right during walking.

The following describes an embodiment of the present disclosure in detail with reference to the drawings.

Embodiment

Figure 1B:
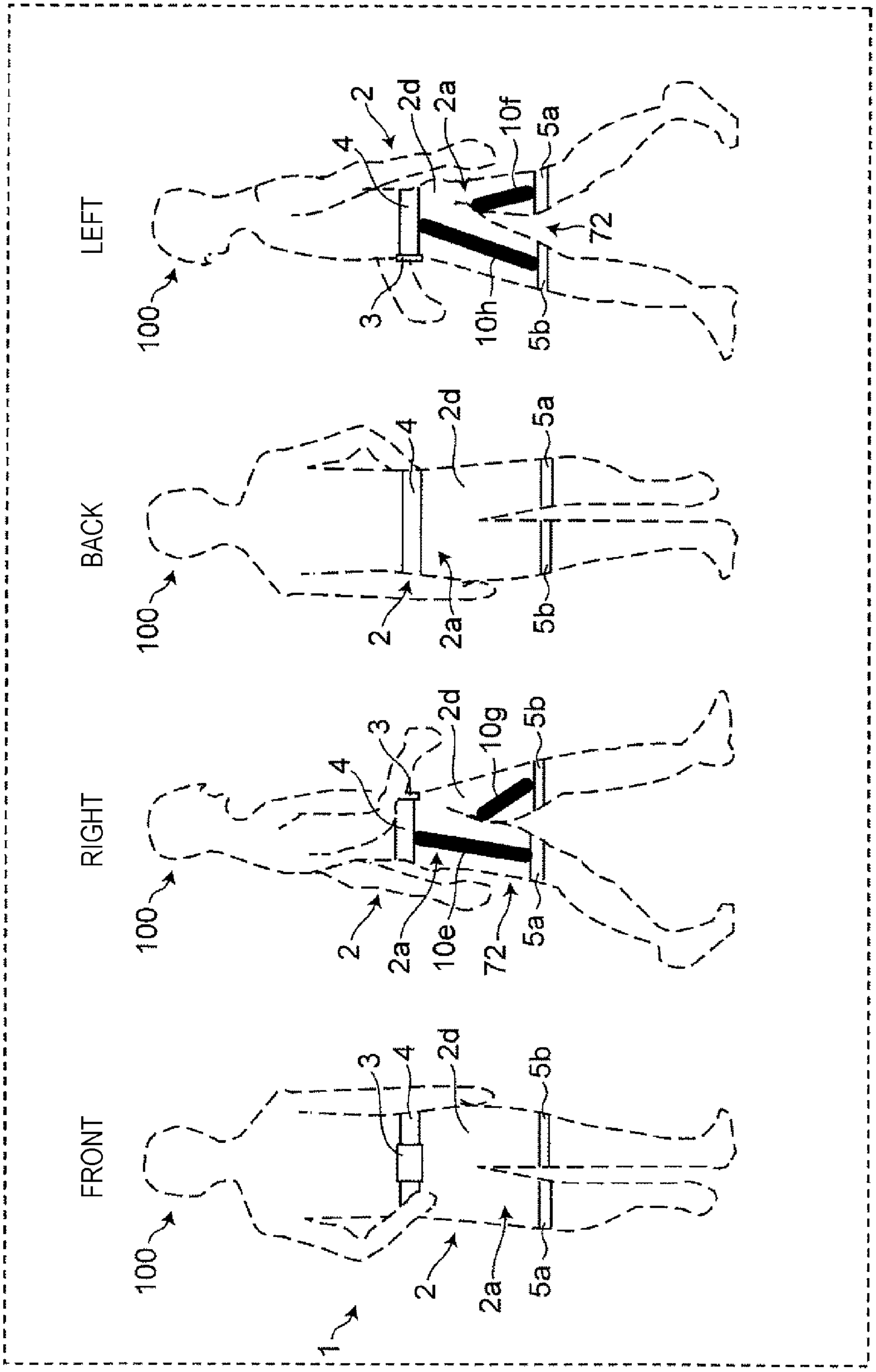
FIG. 1B is a diagram illustrating the arrangement of assist pants and wires as a second example of the assist garment.
Figure 1C:
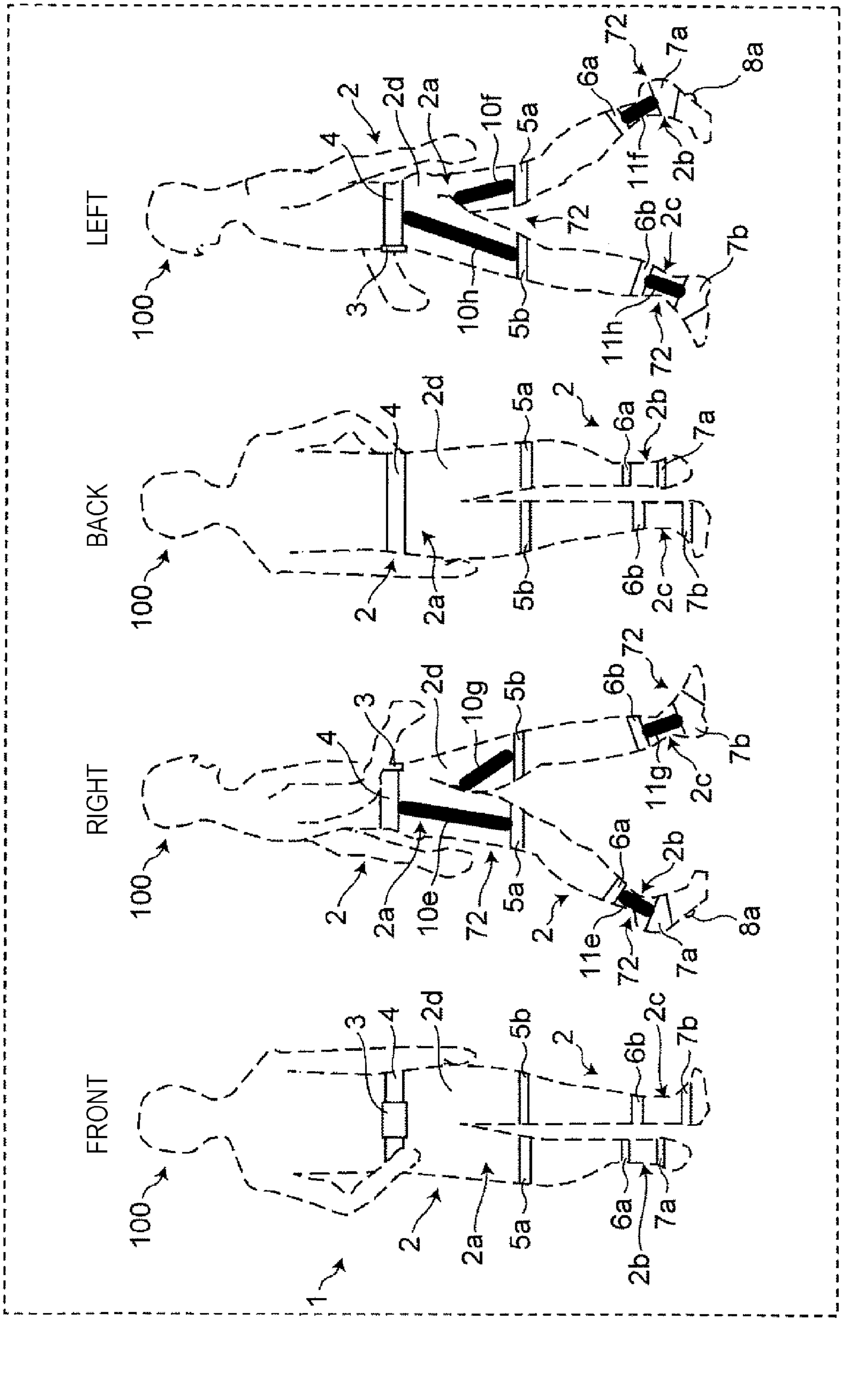
FIG. 1C is a diagram illustrating the arrangement of upper ankle belts, lower ankle belts, assist pants, and wires as a third example of the assist garment.
Figure 2:
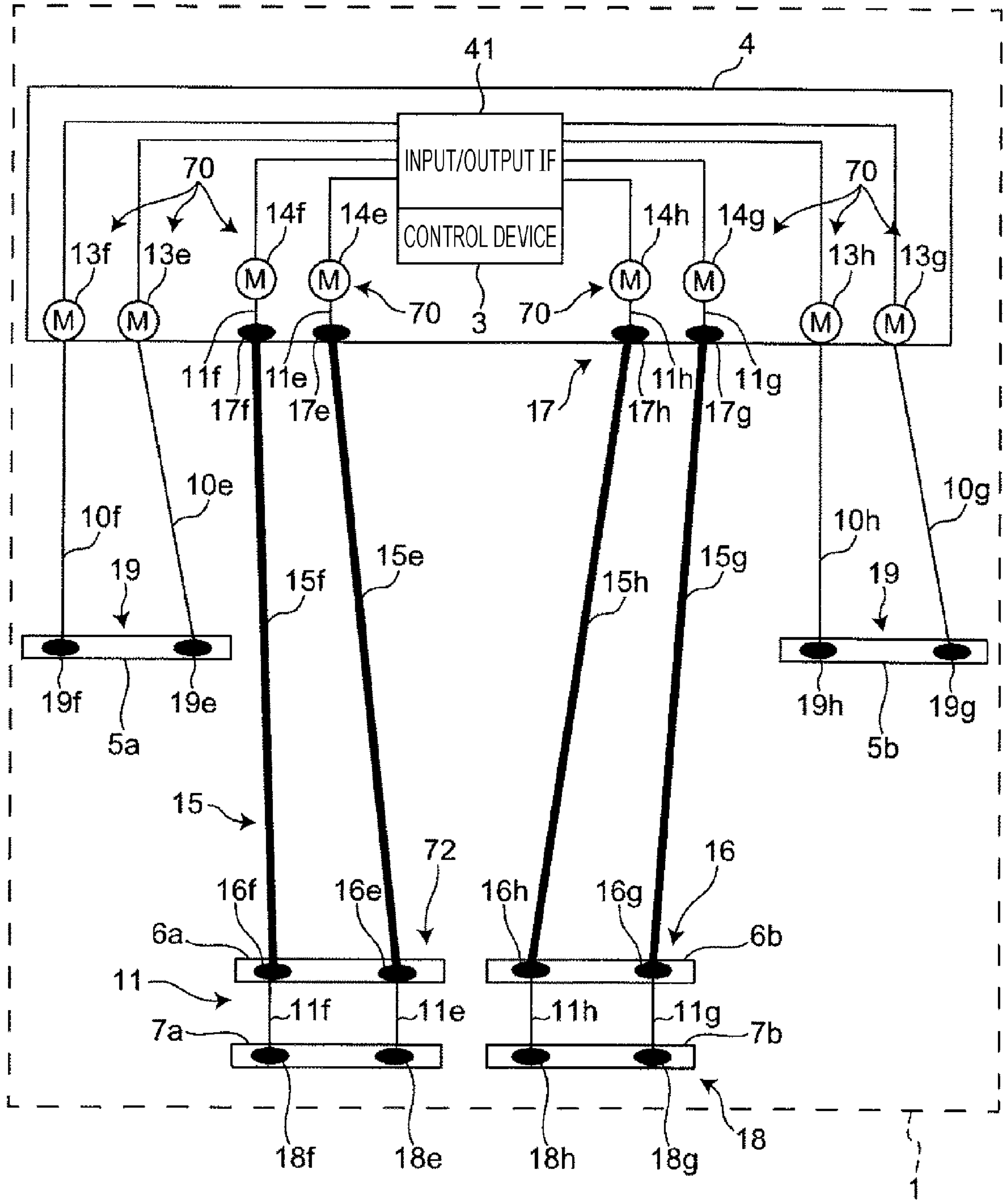
FIG. 2 is an explanatory diagram illustrating the configuration of the apparatus for fall prevention during walking in the embodiment of the present disclosure.
Figure 3A:
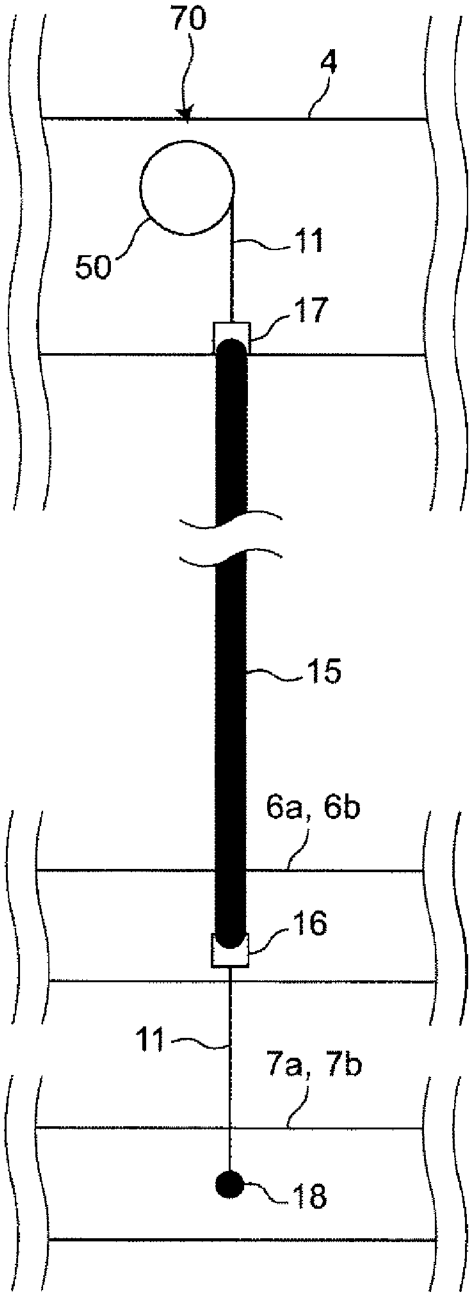
FIG. 3A is an explanatory diagram describing how a pulley, an outer wire, and an ankle wire in the apparatus for fall prevention during walking are attached.
Figure 3B:
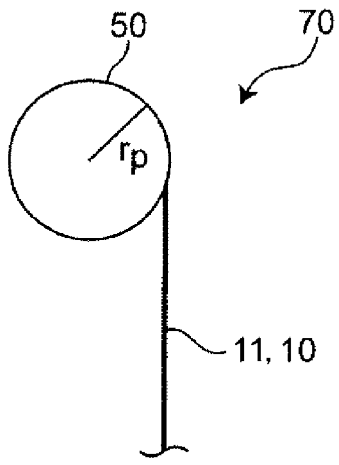
FIG. 3B is front view of an example of a tension application mechanism of the apparatus for fall prevention during walking, illustrating the configuration of a pulley and a wire.
Figure 3C:
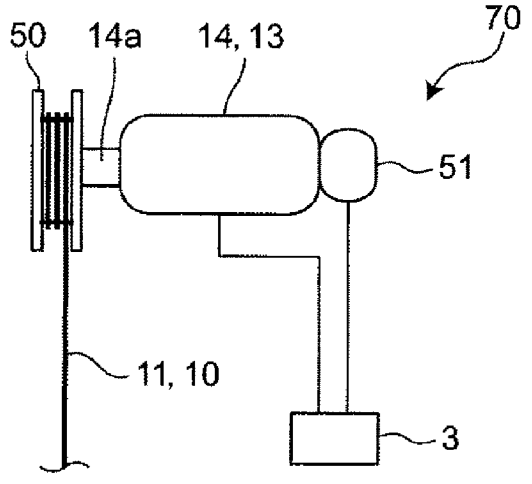

FIG. 1A to FIG. 1C are diagrams illustrating three examples when a user wearing an assist mechanism 2 in an assist system 1, which is an example of an apparatus for fall prevention during walking according to an embodiment of the present disclosure, uses the assist system 1. FIG. 2 is an explanatory diagram illustrating an overview of the assist system 1 illustrated in FIG. 1C as an example of an apparatus for fall prevention during walking according to one embodiment of the present disclosure. FIG. 3A is an explanatory diagram describing how an outer wire 15 and an ankle wire 11 in the assist system 1 are attached. FIG. 3B and FIG. 3C are respectively a front view and a side view of an example of a tension application mechanism 70 in the assist system 1, illustrating the configuration of a motor 14 and so on.

The assist system 1 is an apparatus for preventing a user 100 from falling when the user 100 is walking. The assist system 1 includes an assist mechanism 2 that is worn by the user 100, and a control device 3 that controls the operation of the assist mechanism 2.

The assist mechanism 2 includes an assist garment 72 to be worn on at least a portion of the lower part of the body of the user 100, wires, and tension application mechanisms 70. The assist garment 72 has wires. The tension application mechanisms 70 respectively apply tensions to the wires, thereby imparting stiffnesses for fall prevention to the parts of the user 100 covered by the assist garment 72.

For example, reference numeral 11 is used to collectively refer to ankle wires described below, and individual ankle wires are referred to with individual reference numerals 11*e*, 11*f*, 11*g*, and 11*h*. Likewise, reference numeral 15 is used to collectively refer to ankle outer wires described below, and individual ankle outer wires are referred to with individual reference numerals 15*e*, 15*f*, 15*g*, and 15*h*. This also applies to thigh wires 10, motors 13 and 14, lower-end ankle outer wire attachment units 16, upper-end ankle outer wire attachment units 17, lower-end ankle wire attachment units 18, and lower-end thigh wire attachment units 19, described below.

The assist garment 72 is removably worn by the user 100 and will be described here with reference to three examples.

As a first example, as illustrated in FIG. 1A, the assist garment 72 can include assist ankle bands 2*b* and 2*c*. As a second example, as illustrated in FIG. 1B, the assist garment 72 can include assist pants 2*a*. As a third example, as illustrated in FIG. 1C, the assist garment 72 can include both the assist ankle bands 2*b* and 2*c* in the first example and the assist pants 2*a* in the second example. In the following description, the first example and then the second example will be described.

As illustrated in FIG. 1A and FIG. 1C, the assist ankle bands 2*b* and 2*c* in the first example include left and right upper ankle belts 6*b* and 6*a* to be removably fixed on upper parts of the respective ankles of the left and right legs of the user 100, and left and right lower ankle belts, for example, heel belts 7*b* and 7*a*, which are to be removably fixed on lower parts of the left and right ankles, for example, on heels.

The left and right upper ankle belts 6*b* and 6*a* are each formed of a fabric belt, for example. The left and right heel belts 7*b* and 7*a* are each formed of a fabric belt, for example. The left and right upper ankle belts 6*b* and 6*a* and the left and right heel belts 7*b* and 7*a* are removably worn on the left and right ankles of the user 100.

The tension application mechanisms 70 are included in, for example, a waist belt 4 to be removably worn on the waist of the user 100.

The assist garment 72 in the first example has ankle wires 11 as wires. The ankle wires 11 include first to fourth ankle wires 11*e*, 11*f*, 11*g*, and 11*h* having flexibility but not allowed to expand or contract longitudinally, each of which is made of, for example, metal.

The first to fourth ankle wires 11*e*, 11*f*, 11*g*, and 11*h* each have an upper end fixed to a corresponding one of the tension application mechanisms 70, and are given tensions applied by the tension application mechanisms 70, thereby allowing the first to fourth ankle wires 11*e*, 11*f*, 11*g*, and 11*h* to act as pseudo-springs to change the stiffness for the thighs. The first to fourth ankle wires 11*e*, 11*f*, 11*g*, and 11*h* have lower ends extending through the upper ankle belts 6*b* and 6*a* and then fixed to the left and right heel belts 7*b* and 7*a*. Specifically, the lower ends of the first to fourth ankle wires 11*e*, 11*f*, 11*g*, and 11*h* are respectively fixed to lower-end ankle wire attachment units 18*e* and 18*f*, 18*g*, and 18*h* of the left and right heel belts 7*b* and 7*a*. A tension application mechanism may be referred to as a tension controller.

Specifically, the first ankle wire 11*e* is located in a portion corresponding to a right side surface of the right ankle of the user 100 in the longitudinal direction of the right leg of the user 100. The first ankle wire 11*e* extends through a lower-end ankle outer wire attachment unit 16*e* of the right upper ankle belt 6*a*, and the lower end thereof is coupled to the lower-end ankle wire attachment unit 18*e* of the right heel belt 7*a*.

The second ankle wire 11*f* is located in a portion corresponding to a left side surface of the right ankle of the user 100 in the longitudinal direction of the right leg of the user 100. The second ankle wire 11*f* extends through a lower-end ankle outer wire attachment unit 16*f* of the right upper ankle belt 6*a*, and the lower end thereof is coupled to the lower-end ankle wire attachment unit 18*f* of the right heel belt 7*a*.

The third ankle wire 11*g* is located in a portion corresponding to a right side surface of the left ankle of the user 100 in the longitudinal direction of the left leg of the user 100. The third ankle wire 11*g* extends through a lower-end ankle outer wire attachment unit 16*g* of the left upper ankle belt 6*b*, and the lower end thereof is coupled to the lower-end ankle wire attachment unit 18*g* of the left heel belt 7*b*.

The fourth ankle wire 11*h* is located in a portion corresponding to a left side surface of the left ankle of the user 100 in the longitudinal direction of the left leg of the user 100. The fourth ankle wire 11*h* extends through a lower-end ankle outer wire attachment unit 16*h* of the left upper ankle belt 6*b*, and the lower end thereof is coupled to the lower-end ankle wire attachment unit 18*h* of the left heel belt 7*b*.

Note that the ankle wires 11 merely extend through the lower-end ankle outer wire attachment units 16 of the upper ankle belts 6*a* and 6*b*, but are not fixed. As described in detail below with reference to FIG. 2, lower ends of the ankle outer wires 15 are fixed to the lower-end ankle outer wire attachment units 16, and tensile forces from the ankle wires 11 act between the lower-end ankle outer wire attachment units 16 and the lower-end ankle wire attachment units 18. Thus, the ankle wires 11 are substantially coupled to the lower-end ankle outer wire attachment units 16.

Each of the tension application mechanisms 70 is driven under control of the control device 3 to tighten or loosen the corresponding one of the first to fourth ankle wires 11*e*, 11*f*, 11*g*, and 11*h*. Accordingly, the tensile forces to be applied to the first to fourth ankle wires 11*e*, 11*f*, 11*g*, and 11*h* are individually adjusted in an independent way, thereby imparting stiffnesses for fall prevention to the ankles of the user 100 from the assist garment 72.

Each of the tension application mechanisms 70 can include, for example, a motor and so on. As an example, an example of a motor will be described.

As illustrated in FIG. 3B and FIG. 3C, each of the tension application mechanisms 70 includes, for example, a motor 14, which is driven to rotate by the control device 3. FIG. 3B and FIG. 3C are diagrams illustrating a portion to which the motor 14 and the ankle wire 11 are attached. An encoder 51 is attached to the motor 14. The encoder 51 can detect the rotation angle of a rotating shaft 14*a* of the motor 14 and send the rotation angle to the control device 3. Further, a pulley 50 is fixed to the rotating shaft 14*a* of the motor 14 that rotates forward and in reverse. The upper end of the ankle wire 11, which is exposed above the upper end of the ankle outer wire 15 is fixed to the pulley 50, and then the ankle wire 11 is wound around the pulley 50. If the pulley 50 is assumed to have a radius $r_p$, the pulley 50 rotates one full turn in accordance with the forward or reverse rotation of the motor 14, thereby causing the ankle wire 11 to be pulled out by $2\pi r_p$ or to be wound up. Thus, a leading end of the ankle wire 11 moves by $2\pi r_p$. While no gear is illustrated in this example, the pulley 50 may be attached to the rotating shaft 14*a* of the motor 14 via a gear. The driving of the motor 14 is controlled by the control device 3 on the basis of the angle of the motor 14, which is detected by the encoder 51. Accordingly, the length of the ankle wire 11 is adjusted under control of the control device 3 in accordance with the forward or reverse rotation of the rotating shaft 14*a* of the motor 14 to impart or cancel imparting a tensile force to the ankle wire 11.

However, if tensile forces are caused to act on the first to fourth ankle wires 11*e*, 11*f*, 11*g*, and 11*h* by the tension application mechanisms 70 by using the configuration described above, the tensile forces pull the heel belts 7*b* and 7*a* toward the waist. This ensures that the tensile forces are less likely to act between the upper ankle belts 6*b* and 6*a* and the left and right heel belts 7*b* and 7*a*.

In the first example illustrated in FIG. 1A, accordingly, long hollow tubular ankle outer wires 15 having flexibility, which are made of, for example, metal or synthetic resin, are arranged and fixed between the waist belt 4 and the upper ankle belts 6*a* and 6*b*, and each of the ankle wires 11 is located in a corresponding one of the ankle outer wires 15 in such a manner as to extend therethrough and to be relatively movable. This configuration can prevent tensile forces from acting on the ankle wires 11 from the waist belt 4 to the upper ankle belts 6*b* and 6*a*. Specifically, long tubular ankle outer wires 15*e*, 15*f*, 15*g*, and 15*h* have upper ends fixed to upper-end ankle outer wire attachment units 17*e*, 17*f*, 17*g*, and 17*h* of the waist belt 4, respectively. The ankle outer wires 15*e*, 15*f*, 15*g*, and 15*h* have lower ends fixed to the lower-end ankle outer wire attachment units 16*e* and 16*f*, 16*g*, and 16*h* of the upper ankle belts 6*a* and 6*b*, respectively.

Accordingly, the ankle outer wires 15 allow the distances between the waist belt 4 and the upper ankle belts 6*a* and 6*b* to be fixed, and prevent the tensile forces from acting between the waist belt 4 and the upper ankle belts 6*a* and 6*b* even when the tensile forces act on the ankle wires 11 extending through the respective ankle outer wires 15. Thus, the tensile forces between the waist belt 4 and the upper ankle belts 6*a* and 6*b* can be considered to be negligible. In other words, tensions generated when the ankle wires 11 are tightened by the motors 14 are applied to points between the lower-end outer wire attachment units 16 and the lower-end ankle wire attachment units 18.

Thus, when a tensile force is applied to the ankle wire 11*e* on the outer side of the right leg, the tensile force to be transmitted from the ankle wire 11*e* on the outer side of the right leg to the right side surface (outer side) of the right ankle of the user 100 can be reliably increased between the upper ankle belt 6*a* and the heel belt 7*a*. When the application of the tensile force to the ankle wire 11*e* on the outer side of the right leg is canceled, conversely, the tensile force to be transmitted from the ankle wire 11*e* on the outer side of the right leg to the right side surface (outer side) of the right ankle of the user 100 can be decreased between the upper ankle belt 6*a* and the heel belt 7*a*.

Further, when a tensile force is applied to the ankle wire 11*f* on the inner side of the right leg, the tensile force to be transmitted from the ankle wire 11*f* on the inner side of the right leg to the left side surface (inner side) of the right ankle of the user 100 can be reliably increased between the upper ankle belt 6*a* and the heel belt 7*a*. When the application of the tensile force to the ankle wire 11*f* on the inner side of the right leg is canceled, conversely, the tensile force to be transmitted from the ankle wire 11*f* on the inner side of the right leg to the left side surface (inner side) of the right ankle of the user 100 can be decreased between the upper ankle belt 6*a* and the heel belt 7*a*.

When a tensile force is applied to the ankle wire 11*h* on the outer side of the left leg, the tensile force to be transmitted from the ankle wire 11*h* on the outer side of the left leg to the left side surface (outer side) of the left ankle of the user 100 can be reliably increased between the upper ankle belt 6*b* and the heel belt 7*b*. When the application of the tensile force to the ankle wire 11*h* on the outer side of the left leg is canceled, conversely, the tensile force to be transmitted from the ankle wire 11*h* on the outer side of the left leg to the left side surface (outer side) of the left ankle of the user 100 can be decreased between the upper ankle belt 6*b* and the heel belt 7*b*.

Further, when a tensile force is applied to the ankle wire 11*g* on the inner side of the left leg, the tensile force to be transmitted from the ankle wire 11*g* on the inner side of the left leg to the right side surface (inner side) of the left ankle of the user 100 can be reliably increased between the upper ankle belt 6*b* and the heel belt 7*b*. When the application of the tensile force to the ankle wire 11*g* on the inner side of the left leg is canceled, conversely, the tensile force to be transmitted from the ankle wire 11*g* on the inner side of the left leg to the right side surface (inner side) of the left ankle of the user 100 can be decreased between the upper ankle belt 6*b* and the heel belt 7*b*.

The lower-end ankle outer wire attachment units 16*e* of the upper ankle belt 6*a* is positioned in a portion corresponding to the right side surface of the right ankle. The lower-end ankle outer wire attachment units 16*f* of the upper ankle belt 6*a* is positioned in a portion corresponding to the left side surface of the right ankle. The lower-end ankle outer wire attachment units 16*g* of the upper ankle belt 6*b* is positioned in a portion corresponding to the right side surface of the left ankle. The lower-end ankle outer wire attachment units 16*h* of the upper ankle belt 6*b* is positioned in a portion corresponding to the left side surface of the left ankle. Further, the lower-end ankle wire attachment unit 18*e* of the heel belt 7*a* is positioned in a portion corresponding to the right side surface of the right ankle. The lower-end ankle wire attachment unit 18*f* of the heel belt 7*a* is positioned in a portion corresponding to the left side surface of the right ankle. The lower-end ankle wire attachment unit 18*g* of the heel belt 7*b* is positioned in a portion corresponding to the right side surface of the left ankle. The lower-end ankle wire attachment unit 18*h* of the heel belt 7*b* is positioned in a portion corresponding to the left side surface of the left ankle.

As a result of the configuration described above, the ankle wires 11*e* and 11*f* on the outer side and inner side of the right leg are in antagonistic relation to each other, and the ankle wires 11*g* and 11*h* on the inner side and outer side of the left leg are in antagonistic relation to each other. The motors 14*e* and 14*f* are rotated forward or in reverse independently under control of the control device 3, thereby independently adjusting the length of the ankle wire 11*e* on the outer side and the length of the ankle wire 11*f* on the inner side, respectively. Thus, the pair of ankle wires 11*e* and 11*f* on the outer side and inner side of the right leg, which are in antagonistic relation to each other, are driven to be pulled apart from each other, thereby imparting stiffness to the ankle of the right leg. Further, the motors 14*g* and 14*h* are rotated forward or in reverse independently under control of the control device 3, thereby independently adjusting the length of the ankle wire 11*g* on the inner side and the length of the ankle wire 11*h* on the outer side, respectively. Thus, the pair of ankle wires 11*g* and 11*h* on the inner side and outer side of the left leg, which are in antagonistic relation to each other, are driven to be pulled apart from each other, thereby imparting stiffness to the ankle of the left leg.

Accordingly, each of the motors 14 is rotated under control of the control device 3 on the basis of the rotation angle of the motor 14, which is detected by the encoder 51, to wind up the corresponding one of the ankle wires 11 on the pulley 50 via the rotating shaft 14*a*. Thus, the respective upper ends of the ankle wires 11 are pulled upward and tensile forces are applied to the ankle wires 11. Then, the heel belts 7*a* and 7*b* are pulled upward through the ankle wires 11 so as to approach the upper ankle belts 6*a* and 6*b*. As a result, stiffnesses are transmitted to the left side surfaces of the ankles and the right side surfaces of the ankles at the same time in such a manner that the left and right side surfaces of the ankles are pulled and remain pulled by elastic elements (springs) at the same time. Therefore, the effect of fall prevention can be achieved.

Conversely, when each of the motors 14 is rotated reversely under control of the control device 3 to unwind the corresponding one of the ankle wires 11, the ankle wires 11 move downward and the application of the tensile forces to the ankle wires 11 is canceled. Then, the forces exerted to pull the heel belts 7*a* and 7*b* upward so that the heel belts 7*a* and 7*b* can approach the upper ankle belts 6*a* and 6*b* through the ankle wires 11 disappear. As a result, no stiff body supports the left and right side surfaces of the ankles, making the ankles free to move.

Next, as illustrated in FIG. 1B and FIG. 1C, the second example will be described in which the assist garment 72 includes the assist pants 2*a*.

In the second example, the assist mechanism 2 includes the assist garment 72, which is the assist pants 2*a*, thigh wires 10, and tension application mechanisms 70.

The assist pants 2*a* include an assist pants body 2*d* to be removably worn on the lower part of the body of the user 100, a waist belt 4, and left and right above-knee belts 5*b* and 5*a*.

The waist belt 4 is formed of, for example, a fabric belt fixed to an upper edge of the assist pants body 2*d*. The waist belt 4 is removably attached to the waist of the user 100 to restrain the waist. The left and right above-knee belts 5*b* and 5*a* are formed of, for example, fabric belts fixed to left and right lower edges (cuffs) of the assist pants body 2*d*. The left and right above-knee belts 5*b* and 5*a* are removably attached to the left and right knee portions of the user 100 to restrain the left and right knee portions.

As illustrated in FIG. 1B and FIG. 1C, the thigh wires 10 are located between the waist belt 4 of the assist pants body 2*d* and the left and right above-knee belts 5*b* and 5*a* in the longitudinal direction of the left leg or right leg of the user 100. The thigh wires 10 include first to fourth thigh wires 10*e*, 10*f*, 10*g*, and 10*h* having flexibility but not allowed to expand or contract longitudinally, each of which is made of, for example, metal. The first to fourth thigh wires 10*e*, 10*f*, 10*g*, and 10*h* each have an upper end fixed to a corresponding one of the tension application mechanisms 70, and are given tensions applied by the tension application mechanisms 70, thereby allowing the first to fourth thigh wires 10*e*, 10*f*, 10*g*, and 10*h* to act as pseudo-springs to change the stiffness for the thighs.

Specifically, the thigh wire 10*e* is located in a portion of the assist pants body 2*d* corresponding to a right thigh outer side (right thigh right side surface) of the user 100. The thigh wire 10*e* has a lower end coupled to the waist belt 4 and a lower-end thigh wire attachment unit 19*e* of the above-knee belt 5*a* of the right leg. The thigh wire 10*f* is located in a portion of the assist pants body 2*d* corresponding to a right thigh inner side (right thigh left side surface) of the user 100. The thigh wire 10*e* has a lower end coupled to the waist belt 4 and a lower-end thigh wire attachment unit 19*f* of the above-knee belt 5*a* of the right leg. The thigh wire 10*g* is located in a portion of the assist pants body 2*d* corresponding to a left thigh inner side (left thigh right side surface) of the user 100. The thigh wire 10*g* has a lower end coupled to the waist belt 4 and a lower-end thigh wire attachment unit 19*g* of the above-knee belt 5*b* of the left leg. The thigh wire 10*h* is located in a portion of the assist pants body 2*d* corresponding to a left thigh outer side (left thigh left side surface) of the user 100. The thigh wire 10*h* has a lower end coupled to the waist belt 4 and a lower-end thigh wire attachment unit 19*h* of the above-knee belt 5*b* of the left leg.

As a result of the configuration described above, the thigh wires 10*e* and 10*f* on the outer side and inner side of the right leg are in antagonistic relation to each other, and the thigh wires 10*g* and 10*h* on the inner side and outer side of the left leg are in antagonistic relation to each other. The motors 13*e* and 13*f* are rotated forward or in reverse independently under control of the control device 3, thereby independently adjusting the length of the thigh wire 10*e* on the outer side and the length of the thigh wire 10*f* on the inner side, respectively. Thus, the pair of thigh wires 10*e* and 10*f* on the outer side and inner side of the right leg, which are in antagonistic relation to each other, are driven to be pulled apart from each other, thereby imparting stiffness to the thigh of the right leg. Further, the motors 13*g* and 13*h* are rotated forward or in reverse independently under control of the control device 3, thereby independently adjusting the length of the thigh wire 10*g* on the inner side and the length of the thigh wire 10*h* on the outer side, respectively. Thus, the pair of thigh wires 10*g* and 10*h* on the inner side and outer side of the left leg, which are in antagonistic relation to each other, are driven to be pulled apart from each other, thereby imparting stiffness to the thigh of the left leg.

Each of the tension application mechanisms 70 is driven under control of the control device 3 to tighten or loosen the corresponding one of the first to fourth thigh wires 10*e*, 10*f*, 10*g*, and 10*h*. Accordingly, the tensile forces to be applied to the first to fourth thigh wires 10*e*, 10*f*, 10*g*, and 10*h* are individually adjusted in an independent way, thereby imparting stiffnesses for fall prevention to the thighs of the user 100 from the assist garment 72.

The tension application mechanisms 70 are included in, for example, the waist belt 4. Similarly to the motor 14 illustrated in FIG. 3B and FIG. 3C, each of the tension application mechanisms 70 includes, for example, a motor 13 for driving thigh wires, which are driven to rotate by the control device 3. A portion to which each of the motors 13 and the corresponding one of the wires 10 are attached is the same as the portion illustrated in FIG. 3B and FIG. 3C to which one of the motors 14 and the corresponding one of the wires 11 are attached, with the corresponding reference numerals being displayed in parentheses in FIG. 3B and FIG. 3C, which will not be described herein.

The upper end of each of the thigh wires 10*e*, 10*f*, 10*g*, and 10*h* is coupled to a pulley 50 fixed to the rotating shaft of the corresponding one of the motors 13*e*, 13*f*, 13*g*, and 13*h*. Accordingly, the length of each of the thigh wires 10*e*, 10*f*, 10*g*, and 10*h* between the waist belt 4 and the left and right above-knee belts 5*b* and 5*a* is adjusted under control of the control device 3 in accordance with the forward or reverse rotation of the rotating shaft of the corresponding one of the motors 13*e*, 13*f*, 13*g*, and 13*h* on the basis of the rotation angle of the motor 13, which is detected by the encoder 51, to impart or cancel imparting a tensile force to the corresponding one of thigh wires 10.

Accordingly, each of the motors 13 is rotated under control of the control device 3 to wind up the corresponding one of the thigh wires 10 on the pulley 50 via the rotating shaft. Thus, the respective upper ends of the thigh wires 10 are pulled upward and tensile forces are applied to the thigh wires 10. Then, the above-knee belts 5*b* and 5*a* are pulled upward through the thigh wires 10 so as to approach the waist belt 4. As a result, stiffnesses are transmitted to the left side surfaces of the thighs and the right side surfaces of the thighs at the same time in such a manner that the left and right side surfaces of the thighs are pulled and remain pulled by elastic elements (springs) at the same time. Therefore, the effect of fall prevention can be achieved.

Conversely, when each of the motors 13 is rotated reversely under control of the control device 3 to unwind the corresponding one of the thigh wires 10, the thigh wires 10 move downward and the application of the tensile forces to the thigh wires 10 is canceled. Then, the forces exerted to pull the above-knee belts 5*b* and 5*a* upward so that the above-knee belts 5*b* and 5*a* can approach the waist belt 4 through the thigh wires 10 disappear. As a result, no stiff body supports the left and right side surfaces of the thighs, making the thighs free to move.

Figure 4A:
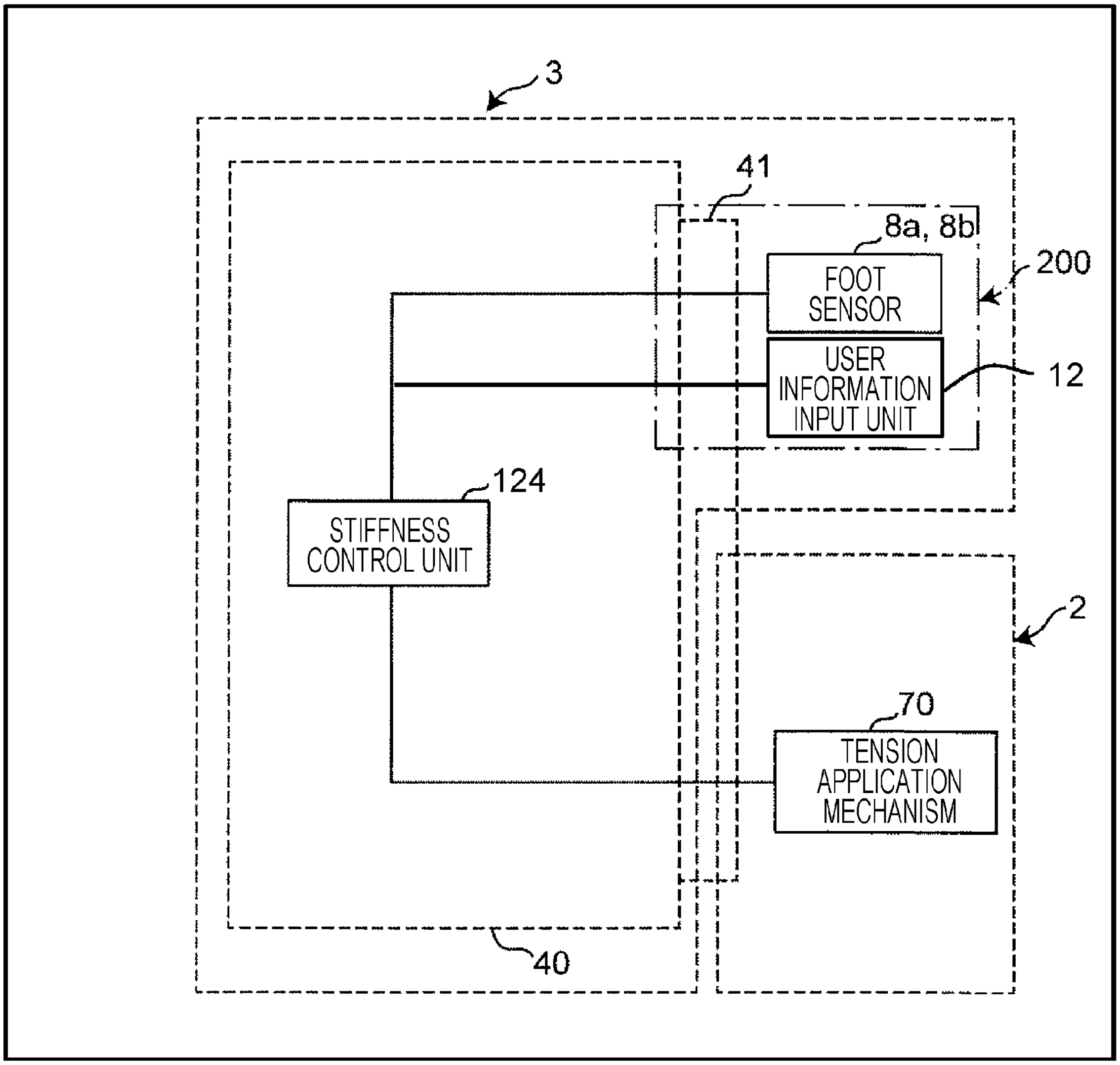
FIG. 4A is a block diagram illustrating a control device and a control target in the apparatus for fall prevention during walking according to the embodiment of the present disclosure.

FIG. 4A is a block diagram illustrating the control device 3, a control target, namely, the tension application mechanism 70 in the assist mechanism 2, and an input interface unit 200 on the input side of the control device 3 in the embodiment of the present disclosure. The schematic configuration of the control device 3 will be first described with reference to FIG. 4A. The input interface unit may be referred to as an obtainer.

The control device 3 controls the operation of the assist mechanism 2. The control device 3 includes the input interface unit 200 and a stiffness control unit 124.

The input interface unit 200 obtains information about a contact surface 90 where the user 100 walks, that is, ground-contact state information, as an example of walk information.

The stiffness control unit 124 controls a pair of tension application mechanisms 70 that are to control stiffnesses to be transmitted to parts of a user on the basis of information about the contact surface 90, which is obtained by the input interface unit 200, to control the tensions of wires included in a pair of wires corresponding to the pair of tension application mechanisms 70 at the same time. Thus, stiffnesses to be transmitted to the right side surface and left side surface of the left ankle, which are parts of the user corresponding to a first pair of wires, are changed at the same time, stiffnesses to be transmitted to the right side surface and left side surface of the right ankle, which are parts of the user corresponding to a second pair of wires, are changed at the same time, stiffnesses to be transmitted to the right side surface and left side surface of the left thigh, which are parts of the user corresponding to a third pair of wires, are changed at the same time, and stiffnesses to be transmitted to the right side surface and left side surface of the right thigh, which are parts of the user corresponding to a fourth pair of wires, are changed at the same time.

A pair including the ankle wire 11*e* on the outer side (right side surface) of the right leg and the ankle wire 11*f* on the inner side (left side surface) of the right leg corresponds to the right ankle of the user. A pair including the ankle wire 11*g* on the inner side (right side surface) of the left leg and the ankle wire 11*h* on the outer side (left side surface) of the left leg corresponds to the left ankle of the user. A pair including the thigh wire 10*e* on the outer side (right side surface) of the right leg and the thigh wire 10*f* on the inner side (left side surface) of the right leg corresponds to the right thigh of the user. A pair including the thigh wire 10*g* on the inner side (right side surface) of the left leg and the thigh wire 10*h* on the outer side (left side surface) of the left leg corresponds to the left thigh of the user.

This control will be described in more detail.

Figure 4B:
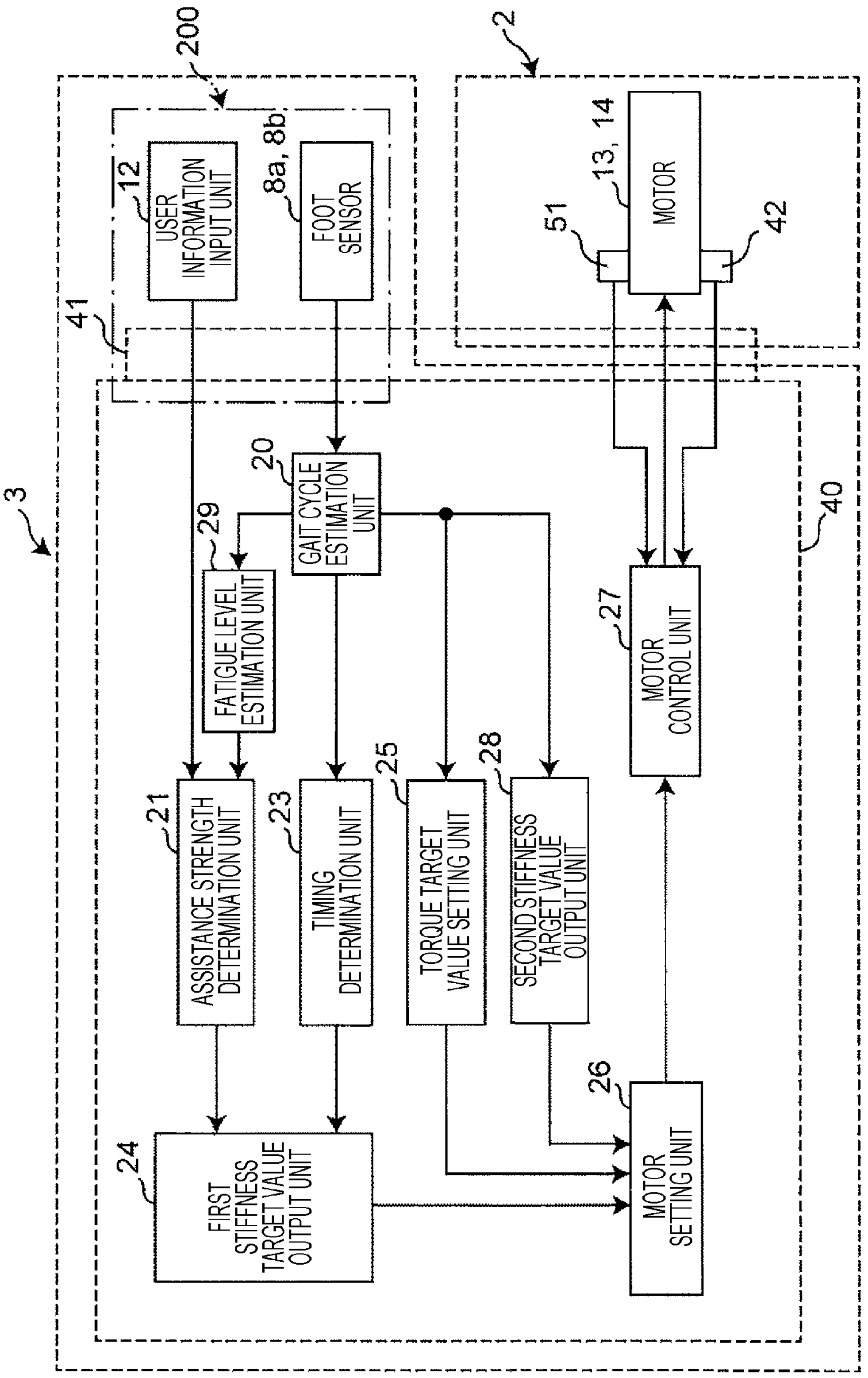
FIG. 4B is a block diagram more specifically illustrating the control device and the control target in the apparatus for fall prevention during walking according to the embodiment of the present disclosure.

FIG. 4B is a block diagram illustrating a specific configuration when the tension application mechanism 70 is the motor 13 or 14. The following describes a configuration common to the first to third examples, whether information to be handled is information concerning the ankles, information concerning the thighs, or information concerning both the ankles and the thighs. Since a basic operation of imparting or canceling imparting stiffnesses to the corresponding parts of the user is the same, the description will be given based on mainly information concerning the ankles or the thighs.

In this embodiment, the control device 3 is constituted by a typical microcomputer, by way of example. The control device 3 includes a control program 40, which is a controller including a first stiffness target value output unit 24 functioning as an example of a stiffness control unit, and the input interface unit 200 that obtains user information concerning the user 100. Thus, the control device 3 activates the motor 13 or 14 to change the tension of the wire 11 or 10 connected to the motor 13 or 14. A tension is generated so that the tension of the wire 10 or 11 is equal to a tension proportional to the amount of change in length, as with a spring, thereby generating stiffness on the thigh or ankle defined between two points connected by the thigh wire 10 or the ankle wire 11, as described above.

The first stiffness target value output unit 24 controls the driving of a pair of motors 13 or a pair of motors 14 to adjust the lengths of a pair of thigh wires 10 or a pair of ankle wires 11, which are in antagonistic relation to each other, at the same time, thereby changing the stiffnesses to be transmitted to the left side surface and right side surface of the left thigh, the right thigh, the left ankle, or the right ankle at the same time.

Specifically, the first stiffness target value output unit 24 controls the pair of motors 14*e* and 14*f* on the basis of the user information concerning the user 100 and walk information, which are obtained by the input interface unit 200, to independently control the respective tensions of the pair of ankle wires 11*e* and 11*f*, thereby changing the stiffnesses to be transmitted to the left side surface and right side surface of the right ankle at the same time. Further, at the same time, the first stiffness target value output unit 24 further performs control to control the pair of motors 14*g* and 14*h* to independently control the respective tensions of the pair of ankle wires 11*g* and 11*h*, thereby changing the stiffnesses to be transmitted to the left side surface and right side surface of the left ankle at the same time.

Further, specifically, the first stiffness target value output unit 24 controls the pair of motors 13*e* and 13*f* on the basis of the walk information about the contact surface 90, which is obtained by the input interface unit 200, to independently control the respective tensions of the pair of thigh wires 10*e* and 10*f*, thereby changing the stiffnesses to be transmitted to the left side surface and right side surface of the right thigh at the same time. Further, at the same time, the first stiffness target value output unit 24 performs control to control the pair of motors 13*g* and 13*h* to independently control the respective tensions of the pair of thigh wires 10*g* and 10*h*, thereby changing the stiffnesses to be transmitted to the left side surface and right side surface of the left thigh at the same time.

The input interface unit 200 functions as an example of an information obtaining unit at least including a user information input unit 12 functioning as an example of a user information obtaining unit and foot sensors 8*a* and 8*b* as an example of a walk information obtaining device that obtains walk information about a walking action of the user 100. As a specific example, the input interface unit 200 includes an input/output IF 41, the user information input unit 12, and the foot sensors 8*a* and 8*b* that obtain walk information concerning, for example, walking conditions under which the user 100 is walking.

The input/output IF (interface) 41 includes, for example, a D/A board, an A/D board, and a counter board, which are connected to expansion slots of a PCI bus or the like of a microcomputer.

The control device 3 sends a control signal to the motor 13 or 14 via the input/output IF 41 as an example of an output unit. Further, as an input unit, the control device 3 accepts signals from the foot sensors 8*a* and 8*b* and information from the user information input unit 12 via the input/output IF 41. As a specific example, the control device 3 includes a gait cycle estimation unit 20, an assistance strength determination unit 21, a timing determination unit 23, the first stiffness target value output unit 24, a torque target value setting unit 25, a motor setting unit 26, a motor control unit 27, a second stiffness target value output unit 28, and a fatigue level estimation unit 29. The user information obtaining unit may be referred to as a user information obtainer.

As an example, the user information input unit 12 is constituted by, for example, a mobile device such as a touch panel or a smartphone, which is included in the assist pants 2*a* or the assist ankle bands 2*b* and 2*c* or is configured separately from the assist pants 2*a* or the assist ankle bands 2*b* and 2*c* and is used by the user 100. Before usage, the user 100 uses the user information input unit 12 to input the age, the severity of impairment (for example, an injury to a leg), and/or the fatigue level (i.e., information on a fatigue state) of the user 100 to the assistance strength determination unit 21 as an example of user information.

Figure 4C:
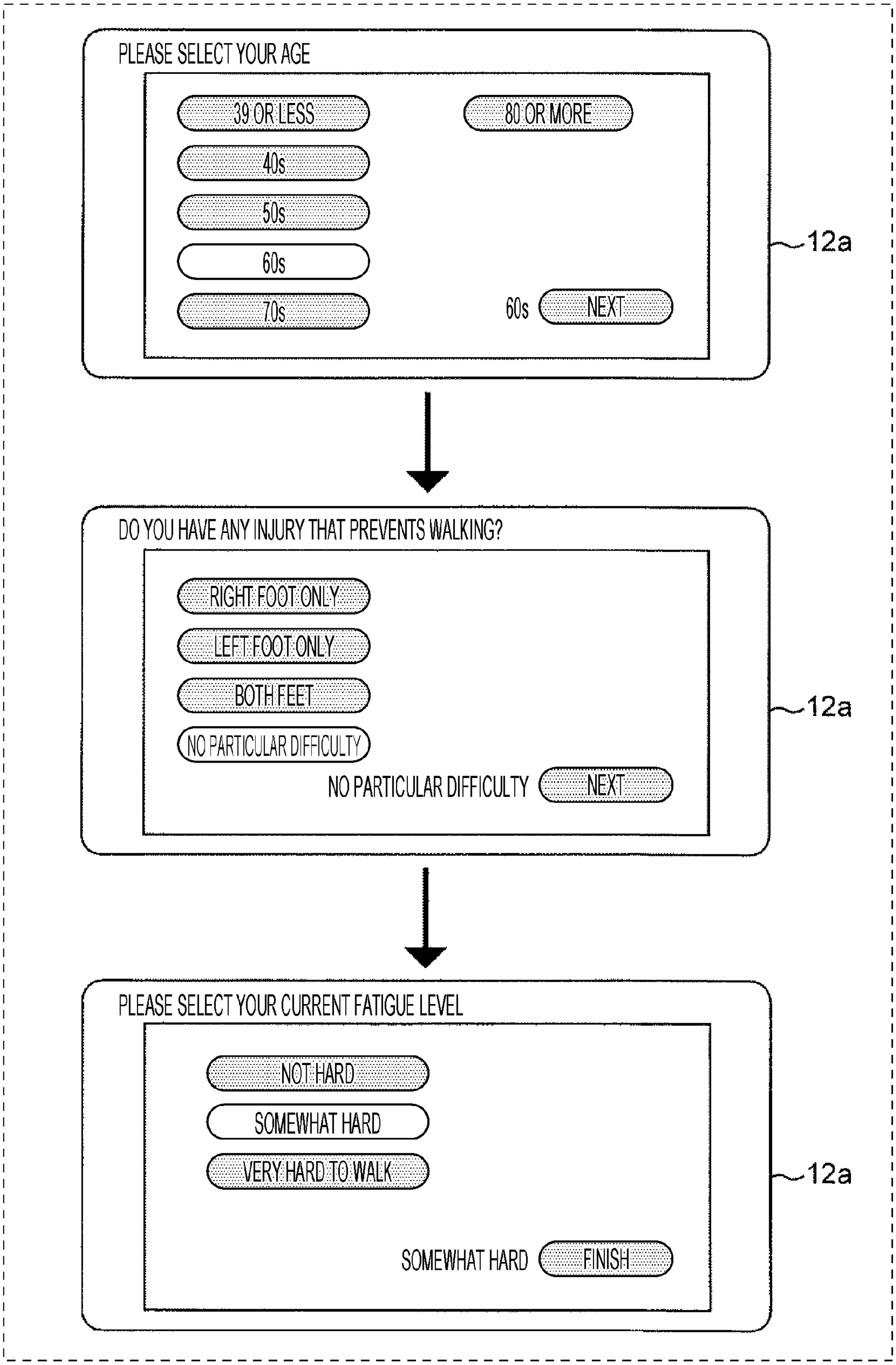
FIG. 4C is a diagram illustrating example display of a touch panel that is an example of a user information input unit in the embodiment of the present disclosure.

FIG. 4C is a diagram illustrating display and operation on a touch panel 12*a* as an example of the user information input unit 12.

First, the user 100 initially selects one of the selection buttons of ages on the touch panel 12*a* and presses a "next" button. That is, the user 100 inputs information concerning an age.

Then, with respect to an injury or impairment that can cause walking difficulties, the user 100 selects "right leg only" if the right leg has an injury or impairment that can cause walking difficulties but the left leg has no injury or impairment that can cause walking difficulties, selects "left leg only" if the left leg has an injury or impairment that can cause walking difficulties but the right leg has no injury or impairment that can cause walking difficulties, selects "both legs" if the right leg has an injury or impairment that can cause walking difficulties and the left leg also has an injury or impairment that can cause walking difficulties, and selects "no particular difficulty" if the left leg has no injury or impairment that can cause walking difficulties and the right leg has no injury or impairment that can cause walking difficulties. Then, the user 100 presses a "next" button. That is, the user 100 inputs information concerning the presence or absence of an injury or impairment of the legs.

Finally, the user 100 selects the current fatigue level (i.e., before assistance) and then presses a "finish" button. Here, examples of the fatigue level include "not hard", "somewhat hard", and "very hard to walk", and the user 100 selects any one of the corresponding buttons. That is, the user 100 inputs information indicating a degree of fatigue.

In the example illustrated in FIG. 4C, the user 100 selects the "60s" button as an age, the "no particular difficulty" button as an injury/impairment that can cause walking difficulties, and the "somewhat hard" button as a fatigue level. The unselected buttons are illustrated with hatching, whereas the selected buttons are shown in white.

The user information input unit 12 outputs information about all the items selected in the way described above to the assistance strength determination unit 21 as user information via the input/output IF 41. As described in detail below, the first stiffness target value output unit 24 changes the stiffnesses to be transmitted to the left side surface and right side surface of the corresponding part of the user on the basis of the information about the user 100, which is obtained from the user information input unit 12 via the assistance strength determination unit 21, and on the basis of the walk information from the foot sensors 8*a* and 8*b*.

The foot sensors 8*a* and 8*b* are included in the assist pants 2*a*. Specifically, the foot sensors 8*a* and 8*b* are included in the heel belts 7*a* and 7*b*, the soles of socks including the heel belts 7*a* and 7*b*, or the like. The foot sensors 8*a* and 8*b* detect the ground-contact states of both feet of the user 100 as walk information that is information concerning walking conditions and output ground-contact state information as an example of walk information to the gait cycle estimation unit 20 via the input/output IF 41.

Figure 5:
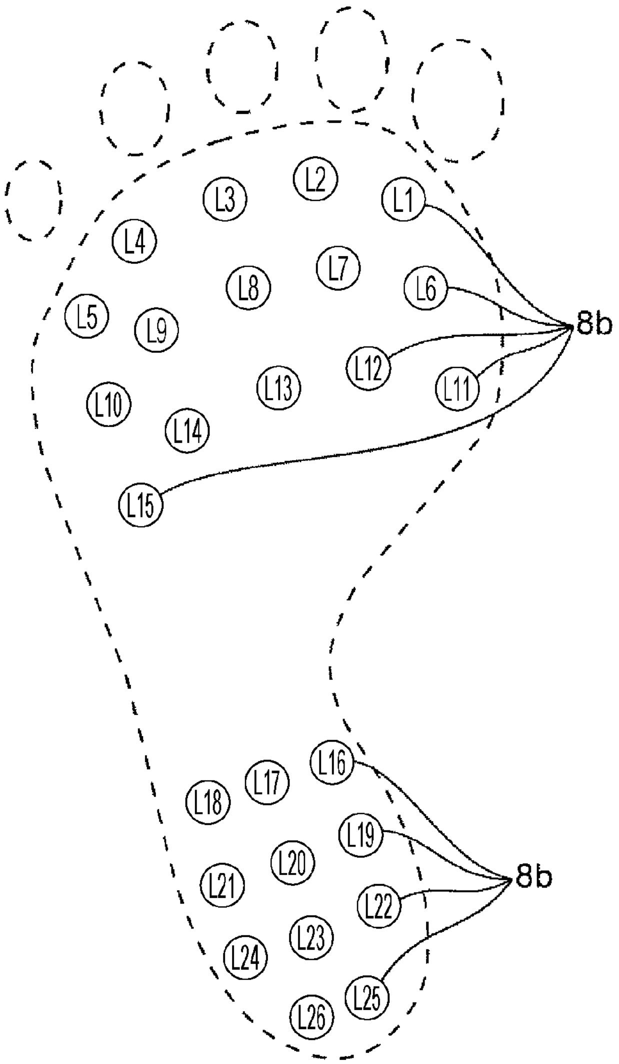
FIG. 5 is a diagram illustrating an example of the arrangement of foot sensors in the embodiment of the present disclosure.

FIG. 5 is a diagram illustrating an example of the arrangement of multiple foot sensors 8*b* included in the sole of the left foot sock or the like. The sole of the right foot sock or the like also includes multiple foot sensors 8*a* in a manner similar to that for the left foot in FIG. 5.

The foot sensors 8*a* and 8*b* include 26 foot sensors L1 to L26 for the left foot and 26 foot sensors R1 to R26 (not illustrated) for the right foot, which are arranged symmetrically with the foot sensors L1 to L26 for the left foot. When the portions having the foot sensors 8*a* and 8*b* are in contact with the contact surface 90, the foot sensors 8*a* and 8*b* output ON signals, whereas when the portions having the foot sensors 8*a* and 8*b* are not in contact with the contact surface 90, the foot sensors 8*a* and 8*b* output OFF signals. Identification information on the 52 foot sensors 8*a* and 8*b* and ON/OFF information about the 52 foot sensors 8*a* and 8*b* are all collectively referred to as ground-contact state information. Since the ground-contact state information includes identification information on the foot sensors 8*a* and 8*b* and ON/OFF information about the foot sensors 8*a* and 8*b*, it is possible to extract, for example, information about whether the heels of the feet are in contact with the contact surface 90.

Figure 6:
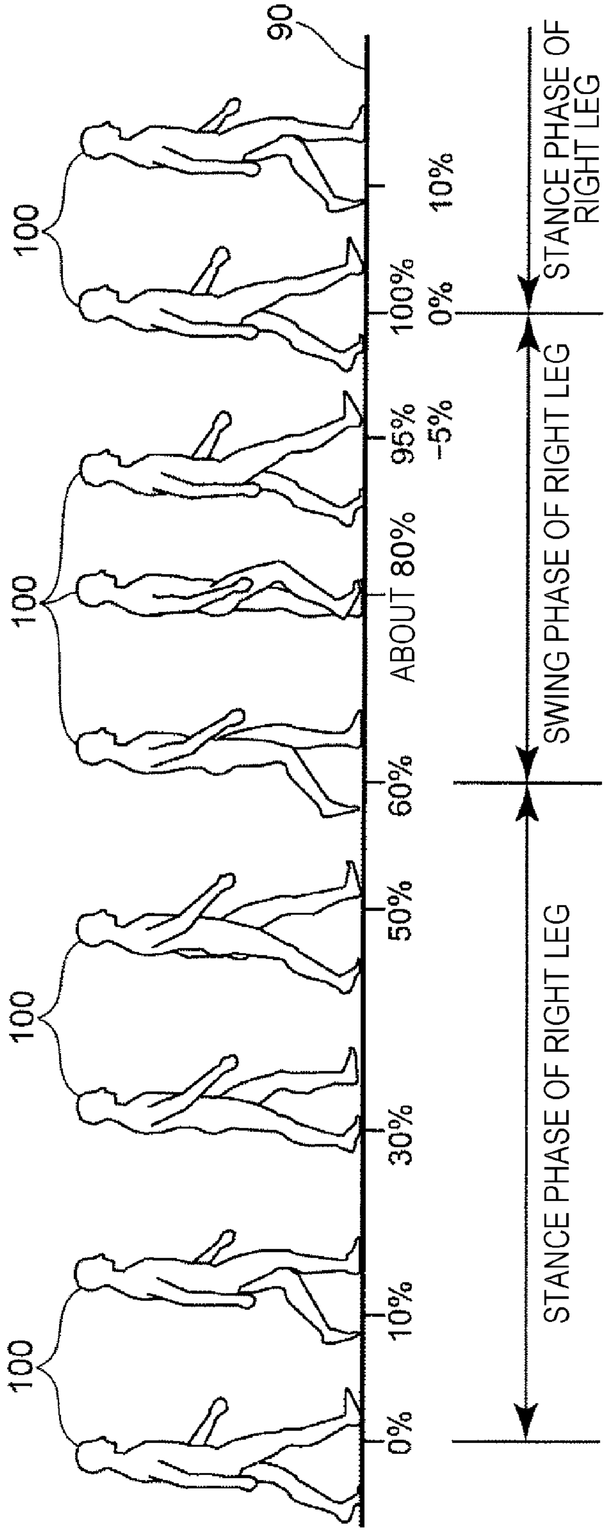
FIG. 6 is a diagram illustrating a gait cycle in the embodiment of the present disclosure.

The gait cycle estimation unit 20 estimates gait cycle information on the basis of the walk information from the foot sensors 8*a* and 8*b* as an example of a walk information obtaining device. Specifically, the gait cycle estimation unit 20 receives ground-contact state information about the left and right feet from the foot sensors 8*a* and 8*b* via the input/output IF 41. The gait cycle estimation unit 20 calculates a gait cycle of the user 100 wearing the assist pants 2*a* or the assist ankle bands 2*b* and 2*c* on the basis of the ground-contact state information from the foot sensors 8*a* and 8*b* and time information on the time from when either of the foot sensors 8*a* and 8*b* is brought into an on-signal state (i.e., information about a walking time), which is obtained from an internal timer. FIG. 6 illustrates a gait cycle of the right leg as an example. As illustrated in FIG. 6, the gait cycle estimation unit 20 defines 0% of the gait cycle when the heel of the right foot contacts the ground. Further, 10% of the gait cycle is set when the left leg completely leaves the contact surface 90, 30% of the gait cycle is set when the heel of the right foot leaves the contact surface 90, 50% of the gait cycle is set when the heel of the left foot contacts the ground, 60% of the gait cycle is set when the right leg completely leaves the contact surface 90, 80% of the gait cycle is set when the heel of the left foot leaves the contact surface 90, and 100%=0% of the gait cycle is set when the heel of the right foot contacts the ground again. Typically, the period of 0% to 60% of a gait cycle, that is, the period during which at least a portion of a leg is in contact with the contact surface 90, is referred to as a stance phase, and the period of 60% to 100% of the gait cycle, that is, the period during which the leg is not completely in contact with the contact surface 90, is referred to as a swing phase. The gait cycle estimation unit 20 outputs information indicating the current percentage of the walking cycle of the user 100 and information about the walking time of the user 100 to the timing determination unit 23, the torque target value setting unit 25, the second stiffness target value output unit 28, and the fatigue level estimation unit 29 as gait cycle information. When the moment at which a foot contacts the ground is defined as 0% of one gait cycle, the time when a state where none of the foot sensors 8*a* and 8*b* is in an ON state is changed to a state where at least one of the foot sensors 8*a* or 8*b* is brought into the ON state is instantaneously determined to correspond to 0% of the gait cycle. Thereafter, an amount of time per cycle is calculated from, for example, information about the preceding cycle (or the previous several cycles) and is added from 0% to define a gait cycle. The controller may include a timer (not illustrated), and the timer may measure an elapsed time from the time point when the user 100 starts walking to the current time as a walking time. The timer may start measuring the time on the basis of the output from the foot sensors 8*a* and 8*b* or in accordance with an instruction from the user. For example, the operation of the timer may be triggered by pressing a start button (not illustrated) included in the apparatus for fall prevention during walking.

The fatigue level estimation unit 29 estimates the fatigue level of the user 100 over time from the gait cycle information output from the gait cycle estimation unit 20 and including the walking time of the user 100, and outputs the fatigue level to the assistance strength determination unit 21 as another example of the user information.

When the fatigue level estimation unit 29 determines that the walking time of the user 100 is longer than a threshold, the control device 3 changes the stiffnesses to be transmitted to the left side surface and right side surface of the corresponding part of the user to larger values. When the fatigue level of the user 100 over time estimated by the fatigue level estimation unit 29 is determined to be higher than a threshold for fatigue levels over time, the control device 3 performs control to change the stiffnesses to be transmitted to the left side surface and right side surface of the corresponding part of the user to larger values. Specifically, the fatigue level estimation unit 29 estimates a fatigue level over time in the following way, for example.

First, the fatigue level estimation unit 29 counts the number of times the gait cycle is returned to 0% from the gait cycle information. Then, the fatigue level estimation unit 29 records information obtained as a result of collecting the counts for 5 minutes, for example, in an internal storage unit (not illustrated). Thus, the numbers of steps within 5 minutes are recorded by the fatigue level estimation unit 29. Then, the fatigue level estimation unit 29 computes changes over time in the number of steps within 5 minutes. If periods of 5 minutes after the period of 5 minutes from the user 100 starting walking include a period of 5 minutes during which the number of steps within 5 minutes decreases relative to the number of steps within the period of 5 minutes from the user 100 starting walking at a rate greater than or equal to a predetermined walking-time threshold, the fatigue level estimation unit 29 determines that this period of 5 minutes is a period of "fatigue".

Figure 7:
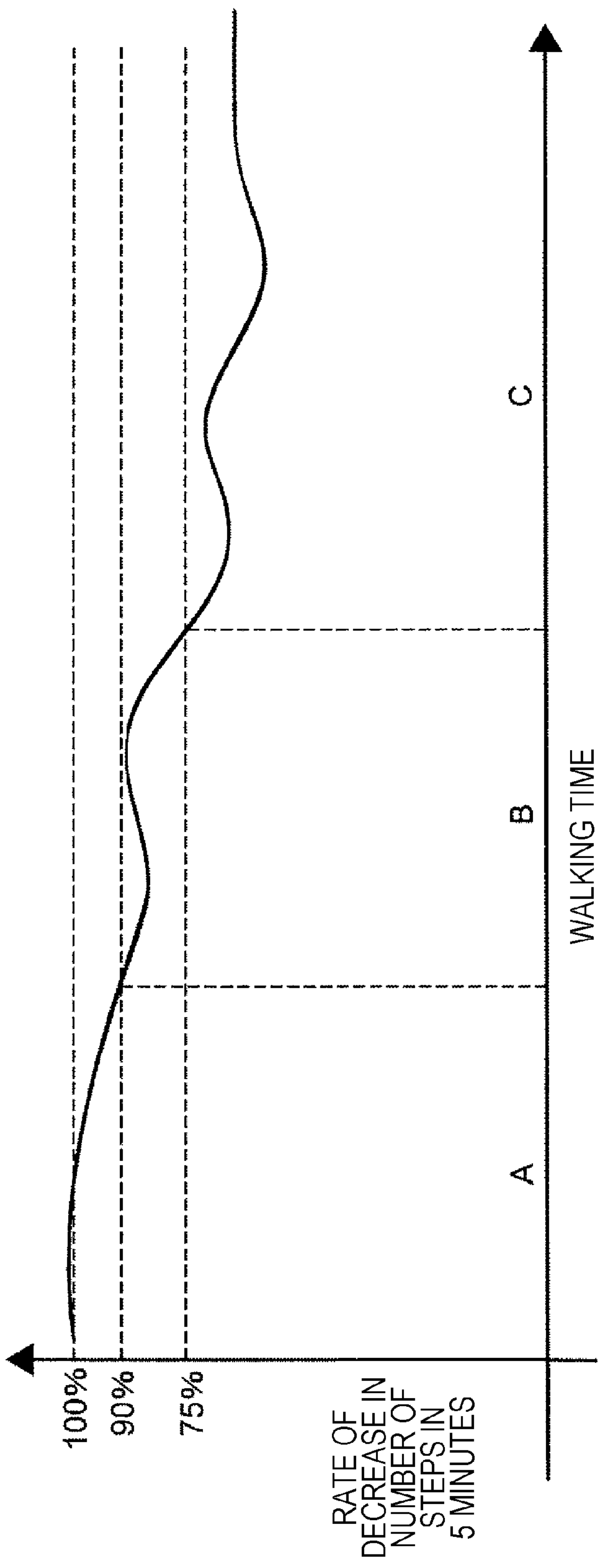
FIG. 7 is a diagram illustrating an example of the operation of a fatigue level estimation unit in the embodiment of the present disclosure.

FIG. 7 is a diagram illustrating an example of a fatigue level determined from gait cycle information by the fatigue level estimation unit 29. The number of steps W0 within the period of 5 minutes from the user 100 starting walking is defined as 100%. When the number of steps within a period of 5 minutes after the period of 5 minutes from the user 100 starting walking is represented by W1, the fatigue level estimation unit 29 determines that a fatigue level point of "0" is obtained in the period "A" over which the result of (W1/W0)×100 is in the range of 100% to 90%. When the number of steps within a period of 5 minutes after the period of 5 minutes from the user 100 starting walking is represented by W2, the fatigue level estimation unit 29 determines that a fatigue level point of "10" is obtained in the period "B" over which the result of (W2/W0)×100 is in the range of 90% to 75%. When the number of steps within a period of 5 minutes after the period of 5 minutes from the user 100 starting walking is represented by W3, the fatigue level estimation unit 29 determines that a fatigue level point of "20" is obtained in the period "C" over which the result of (W3/W0)×100 is less than or equal to 75%. The fatigue level point estimated in this way is represented as a first fatigue level point. That is, the first fatigue level point is determined on the basis of the number of walking steps of the user within a predetermined time.

Then, if the walking time from starting walking exceeds "1 hour", which is an example of a walking-time threshold, the fatigue level estimation unit 29 adds "5" as a second fatigue level point to the first fatigue level point. If the walking time from starting walking exceeds "2 hours", which is another example of the walking-time threshold, the fatigue level estimation unit 29 adds "10" as a second fatigue level point to the first fatigue level point. That is, the second fatigue level point increases as the walking time increases.

The fatigue level estimation unit 29 outputs a point indicating the fatigue level over time, which is the sum of the first fatigue level point and the second fatigue level point described above, to the assistance strength determination unit 21 as a user fatigue level over time. For example, if the walking time from starting walking exceeds 2 hours, for the period "C", the sum of the first fatigue level point "20" and the second fatigue level point "10", which is determined by the fatigue level estimation unit 29, i.e., "30", is output from the fatigue level estimation unit 29 to the assistance strength determination unit 21 as a user fatigue level over time.

Figure 8:
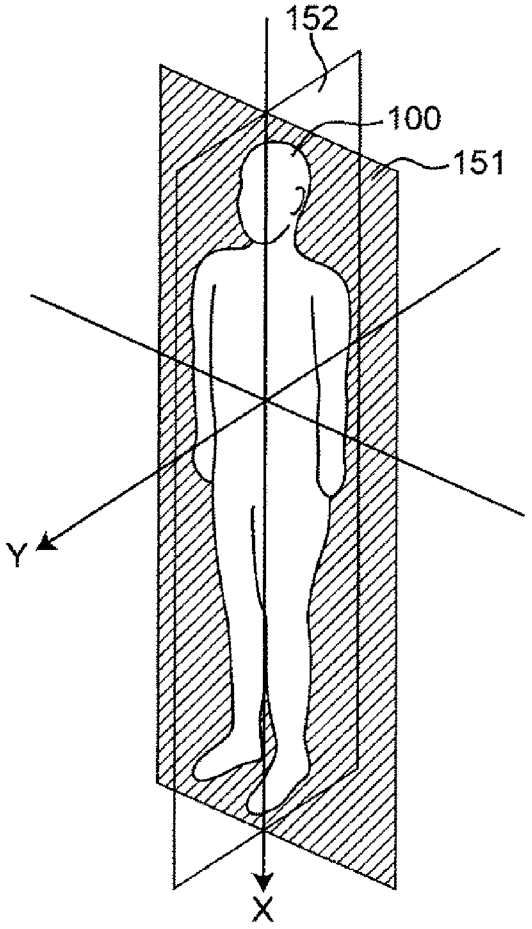
FIG. 8 is a perspective view of the body of a user, illustrating a frontal plane and a sagittal plane.

The assistance strength determination unit 21 determines the strength of assistance with the stiffness for the user 100 in the frontal plane from user input information that is part of the user information input from the user information input unit 12 and from a user fatigue level over time that is part of the user information output from the fatigue level estimation unit 29, and outputs the strength of assistance to the first stiffness target value output unit 24. The frontal direction refers to a direction within a frontal plane. As illustrated in FIG. 8, a frontal plane 151 refers to a plane that divides the body of the user 100 on a longitudinal plane extending in a left-right direction. A plane perpendicular to the frontal plane 151, which divides the body on a longitudinal plane extending in an anterior-posterior direction, is a sagittal plane 152. The frontal direction of the user may be referred to as the left-right direction of the body of the user or the left-right direction of the user.

FIG. 9A to FIG. 9D are diagrams illustrating an example of the operation of the assistance strength determination unit 21. As illustrated in FIG. 9A to FIG. 9D, the assistance strength determination unit 21 stores point information determined based on the user information input from the user information input unit 12 and the fatigue level estimation unit 29.

For example, FIG. 9A species relationship information on a relationship among the age of the user 100, the right-foot point, and the left-foot point. For example, when the age of the user 100 is less than or equal to 39, the right-foot point is set to "10" and the left-foot point is set to "10".

FIG. 9B specifies relationship information on a relationship among walking difficulties experienced by the user 100, the right-foot point, and the left-foot point. For example, when the "right foot only" of the user 100 can cause walking difficulties, the right-foot point is set to "50" and the left-foot point is set to "0". The factor that can cause walking difficulties may refer to an injury or impairment.

FIG. 9C specifies relationship information on a relationship among the fatigue level input by the user 100, the right-foot point, and the left-foot point. For example, when the fatigue level of the user 100 indicates "somewhat hard", the right-foot point is set to "15" and the left-foot point is also set to "15".

FIG. 9D specifies relationship information on a relationship among a fatigue level p of the user 100 over time, the right-foot point, and the left-foot point. For example, when the fatigue level p of the user 100 over time is greater than or equal to "5" as a first threshold for fatigue levels over time and is less than "25" as a second threshold for fatigue levels over time, the right-foot point is set to "10" and the left-foot point is also set to "10". Here, when the fatigue level p of the user 100 over time exceeds the first threshold for fatigue levels over time, namely, "5", the left- and right-foot points are changed from "0" to "10" to increase stiffness. When the fatigue level p of the user 100 over time exceeds the second threshold for fatigue levels over time, namely, "25", the left- and right-foot points are changed from "10" to "20" to increase stiffness.

As illustrated in FIG. 9E, the assistance strength determination unit 21 also stores relationship information indicating an assistance strength for a total point Pt. For example, when the total point Pt of the user 100 is greater than or equal to "20" and less than "50", the assistance strength is set to "2".

Accordingly, as illustrated in FIG. 9E, the assistance strength determination unit 21 determines an assistance strength from the total point Pt of the user 100 based on the pieces of relationship information described above and the user information. The assistance strength is output from the assistance strength determination unit 21 to the first stiffness target value output unit 24.

In the example of the user information illustrated in FIG. 4C, the selected buttons are the "60s" button as an age, the "no particular difficulty" button as an injury/impairment that can cause walking difficulties, and the "somewhat hard" button as a fatigue level. Thus, as illustrated in FIG. 9A to FIG. 9C, "25" points, "0" points, and "15" points are respectively obtained for the right-foot point. The total point Pt, which is given by "25+0+15", is thus 40 points. Also for the left-foot point, the total point Pt, which is given by "25+0+15", is 40 points. Thus, as illustrated in FIG. 9E, since an assistance strength of "2" is obtained with respect to 40 points, the assistance strength determination unit 21 outputs information indicating an assistance strength of "2" for each of the right foot and the left foot to the first stiffness target value output unit 24. As illustrated in FIG. 9D, during walking, the fatigue level estimation unit 29 further adds points due to the fatigue level p over time. For example, when the fatigue level p over time is "10", the fatigue level estimation unit 29 adds 10 points for both feet. The fatigue level estimation unit 29 adds 10 points to 40 points, which are initially obtained, with the total point Pt being 50 points. As illustrated in FIG. 9E, an assistance strength of "3" is obtained with respect to a total point Pt of 50 points. Thus, information about an assistance strength of "3" is output from the assistance strength determination unit 21 to the first stiffness target value output unit 24. The operations described above indicate that, in summary, the first stiffness target value output unit 24 changes the left-right stiffness in accordance with the user information obtained by the user information input unit 12 such that the left-right stiffness increases as the age of the user 100 increases, the left-right stiffness increases if the user 100 has an injured leg, and the left-right stiffness increases as the fatigue state of the user 100 increases.

The timing determination unit 23 outputs, based on the gait cycle information output from the gait cycle estimation unit 20, an instruction for changing the stiffnesses to be transmitted to the left side surface and right side surface of the intended part of the user at the same time (i.e., a stiffness change timing signal or stiffness change timing information) to the first stiffness target value output unit 24, thereby controlling the timing when the first stiffness target value output unit 24 changes the stiffnesses to be transmitted to the left side surface and right side surface of the left leg at the same time and controlling the timing when the first stiffness target value output unit 24 changes the stiffnesses to be transmitted to the left side surface and right side surface of the right leg at the same time. The intended part of the user includes at least one of the left thigh, the right thigh, the left ankle, and the right ankle.

As an example, FIG. 10 illustrates the operation of the timing determination unit 23. "Up" indicates that a signal for increasing the stiffness to be transmitted to the corresponding part of the user is output as a stiffness change timing signal, and "Down" indicates that a signal for decreasing the stiffness to be transmitted to the corresponding part of the user is output as a stiffness change timing signal. In the example in FIG. 10, in a period from 0% to less than 60% of the gait cycle of the right leg, the timing determination unit 23 outputs a signal for increasing the stiffness to be transmitted to the corresponding part of the user. In a period from 60% to less than 98% of the gait cycle of the right leg, the timing determination unit 23 outputs a signal for decreasing the stiffness to be transmitted to the corresponding part of the user. In a period from 98% to 100% (=0%) of the gait cycle of the right leg, the timing determination unit 23 outputs a signal for increasing the stiffness to be transmitted to the corresponding part of the user. In a period from 0% to less than 10% of the gait cycle of the left leg, the timing determination unit 23 outputs a signal for increasing the stiffness to be transmitted to the corresponding part of the user. In a period from 10% to less than 48% of the gait cycle of the left leg, the timing determination unit 23 outputs a signal for decreasing the stiffness to be transmitted to the corresponding part of the user. In a period from 48% to 100% (=0%) of the gait cycle of the left leg, the timing determination unit 23 outputs a signal for increasing the stiffness to be transmitted to the corresponding part of the user. The timing for changing the stiffness to be transmitted to the ankle or thigh of the right leg indicates the timing for changing the stiffnesses to be transmitted to the left side surface and right side surface of the ankle or the left side surface and right side surface of the thigh of the right leg, that is, the timing for changing the stiffnesses for both the ankle wires 11*f* and 11*e* or the stiffnesses for both the thigh wires 10*f* and 10*e*. The timing for changing the stiffness to be transmitted to the ankle or thigh of the left leg indicates the timing for changing the stiffnesses to be transmitted to the left side surface and right side surface of the ankle or the left side surface and right side surface of the thigh of the left leg, that is, the timing for changing the stiffnesses for both the ankle wires 11*h* and 11*g* or the stiffnesses for both the thigh wires 10*h* and 10*g*. Accordingly, stiffnesses for the left and right wires of the ankle or thigh of each leg are always changed at the same time.

The first stiffness target value output unit 24 determines a stiffness target value for motion in the frontal direction when the stiffness is increased, on the basis of the information about the strength of assistance, which is output from the assistance strength determination unit 21, and then selects whether the stiffness target value is a higher stiffness target value or a lower stiffness target value than a current stiffness value (i.e., before assistance) in accordance with the stiffness change timing signal output from the timing determination unit 23. The frontal direction refers to a direction within a frontal plane. As illustrated in FIG. 8, the frontal plane 151 refers to a plane that divides the body of the user 100 on a longitudinal plane extending in a left-right direction. That is, the frontal direction is approximately the left-right direction of the body of the user 100. Note that a plane perpendicular to the frontal plane 151, which divides the body on a longitudinal plane extending in an anterior-posterior direction, is the sagittal plane 152. FIG. 11 illustrates outputs of stiffness for the right leg as an example of the operation of the first stiffness target value output unit 24.

Specifically, the first stiffness target value output unit 24 first selects any one of the four rows illustrated in FIG. 11, namely, the first row (an assistance strength of "1") to the fourth row (an assistance strength of "4"), from the assistance strength information output from the assistance strength determination unit 21. For example, in FIG. 11, the first row is selected when the assistance strength is "1". The stiffness target values illustrated in FIG. 11 are simulated stiffness target values of the wires 10 and 11, by way of example, which are expressed in N/m.

Then, the first stiffness target value output unit 24 selects a column for the time when the stiffness is increased or a column for the time when the stiffness is decreased in accordance with the signal for changing the stiffness, which is output from the timing determination unit 23. Using the respective assistance strengths for the right leg and the left leg, the first stiffness target value output unit 24 determines each of the respective stiffness target values for the right leg and the left leg as an example of a predetermined value. For example, in the previous example, the first row is selected for an assistance strength of "1", and, in addition, the stiffness target value is "20" in a column for the time when the stiffness is increased in the first row or the stiffness target value is "10" in a column for the time when the stiffness is decreased. This operation is performed for each of the left and right legs to determine stiffness target values which are output as control signals.

Each of the right leg and the left leg has a gait cycle. For the right leg, for example, content specified in FIG. 12A, described below, is applicable to the gait cycle of the right leg. For the left leg, for example, content specified in FIG. 12A, described below, is applicable to the gait cycle of the left leg.

Figure 12A:
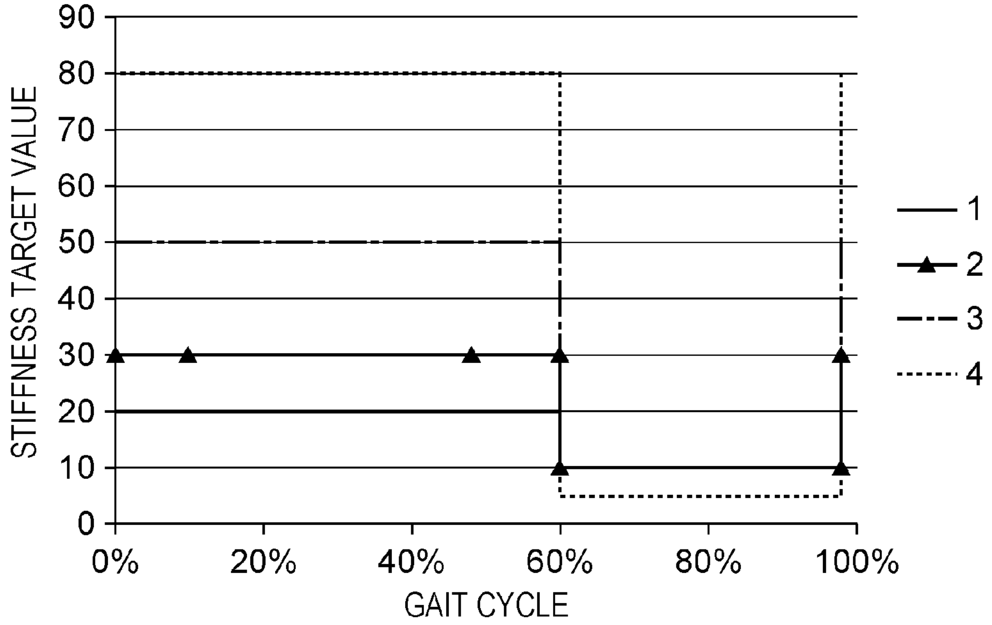
FIG. 12A is a diagram illustrating an example result of determination of a target value of stiffness in the embodiment of the present disclosure.

FIG. 12A illustrates a diagram of an example of the determination of a target value of stiffness by the timing determination unit 23 and the first stiffness target value output unit 24. In FIG. 12A, the horizontal axis represents the gait cycle, and the vertical axis represents the stiffness target value. In FIG. 12A, a graph indicated by a solid line represents an assistance strength of "1", a graph indicated by a solid line with black triangles represents an assistance strength of "2", a graph indicated by a one-dot chain line represents an assistance strength of "3", and a graph indicated by a dotted line represents an assistance strength of "4". In FIG. 12A, the horizontal axis represents the gait cycle, and the vertical axis represents the target value of stiffness. FIG. 12A illustrates a diagram for easily understanding FIG. 10 and FIG. 11, and thus the content specified in FIG. 12A may be used instead of the content specified in FIG. 10 and FIG. 11 to obtain a stiffness target value.

When the timing determination unit 23 inputs a gait cycle, it is determined whether the stiffness value at the timing is high or low. Then, the first stiffness target value output unit 24 determines a high stiffness target value and a low stiffness target value for each assistance strength by using specific values. For example, when the timing determination unit 23 determines that the gait cycle is 0% and the assistance strength determination unit 21 determines that the assistance strength is "1", the first stiffness target value output unit 24 can determine that the stiffness target value is "20".

As illustrated in FIG. 12A, furthermore, for example, when the assistance strength is "1", in order to perform control to set a stiffness target value, before a predetermined time from an expected contact time, to be larger than a stiffness value obtained before a predetermined period in the swing phase, the first stiffness target value output unit 24 performs control to set the left-right stiffness to a stiffness target value of "20", which is larger than a stiffness value of "10", immediately before the foot of the user 100 touches the contact surface 90 (for example, in the period of 98% to 100% of the gait cycle in FIG. 6). Thereafter, for example, when the foot of the user 100 is away from the contact surface 90 (for example, immediately before the period of 60% to 98% in the swing phase of the gait cycle in FIG. 6), the first stiffness target value output unit 24 performs control to return the changed left-right stiffness to a stiffness target value of "10" on the basis of the gait cycle information of the user 100.

Accordingly, the first stiffness target value output unit 24 determines a stiffness target value for assistance, and the determined stiffness target value is output from the first stiffness target value output unit 24 to the motor setting unit 26. The motion in the frontal direction refers to, among the following four motions, first and second two motions, third and fourth two motions, or all of the four motions.

The first motion is the motion of the right thigh in the left-right direction, which is generated by controlling the driving of the pair of motors 13*e* and 13*f* corresponding to the thigh wires 10*e* and 10*f* on the outer side and inner side of the right leg.

The second motion is the motion of the left thigh in the left-right direction, which is generated by controlling the driving of the pair of motors 13*g* and 13*h* corresponding to the thigh wires 10*g* and 10*h* on the inner side and outer side of the left leg.

The third motion is the motion of the right ankle joint in the left-right direction, which is generated by controlling the driving of the pair of motors 14*e* and 14*f* corresponding to the ankle wires 11*e* and 11*f* on the outer side and inner side of the right ankle.

The fourth motion is the motion of the left ankle joint in the left-right direction, which is generated by controlling the driving of the pair of motors 14*g* and 14*h* corresponding to the ankle wires 11*g* and 11*h* on the inner side and outer side of the left ankle.

Figure 12B:
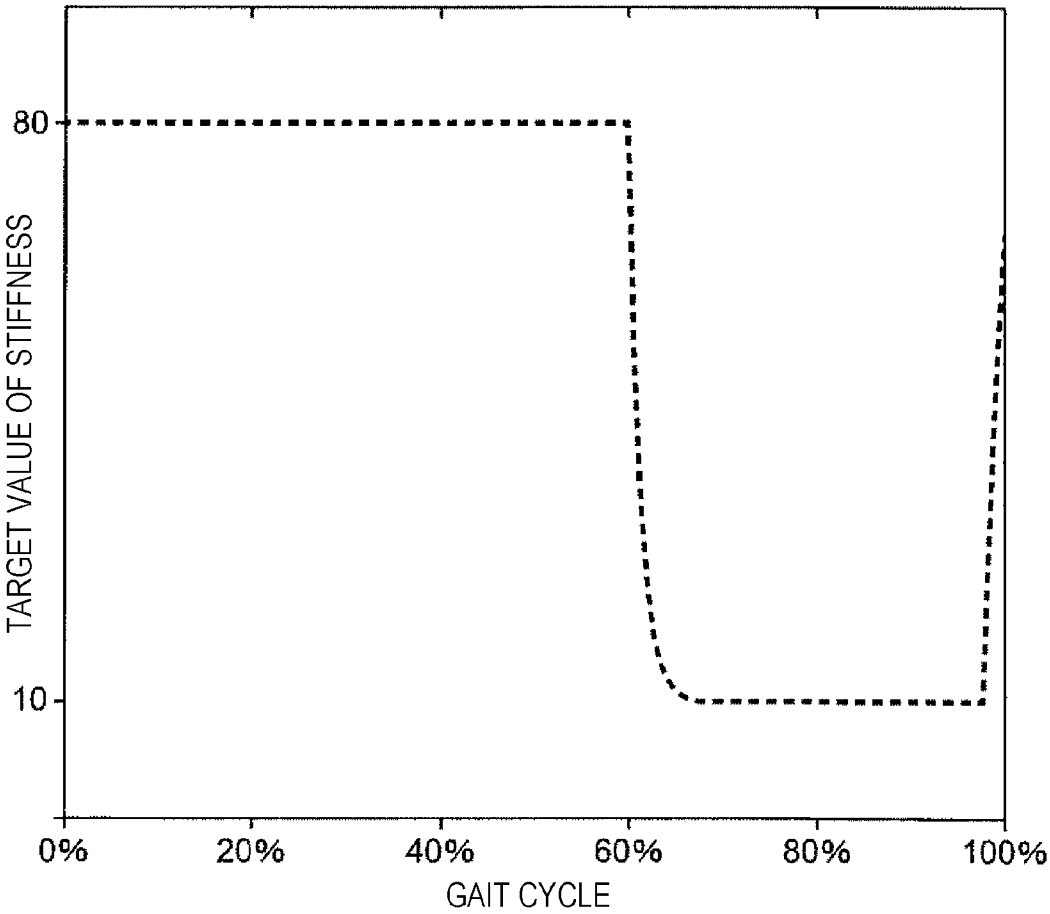
FIG. 12B is a diagram illustrating an example result of determination of a target value of stiffness in a modification of the present disclosure.

The value of stiffness refers to tensile stiffness imparted to the wires 10 or 11 by controlling the rotational driving of the motors 13 or 14, and is expressed in Nm/θ. As illustrated in FIG. 12B, as indicated when the value of stiffness is increased in the period of 98% to 100% of the gait cycle and as indicated when the value of stiffness is decreased in a period around 60% of the gait cycle, the stiffness may be changed smoothly.

The motor setting unit 26 sets the setting values of the thigh motors 13*e*, 13*f*, 13*g*, and 13*h* or the ankle motors 14*e*, 14*f*, 14*g*, and 14*h* on the basis of the stiffness target values output from the first stiffness target value output unit 24, and the set values of the thigh motors 13*e*, 13*f*, 13*g*, and 13*h* or the ankle motors 14*e*, 14*f*, 14*g*, and 14*h* are output from the motor setting unit 26 to the motor control unit 27 as motor control signals.

Figure 13:
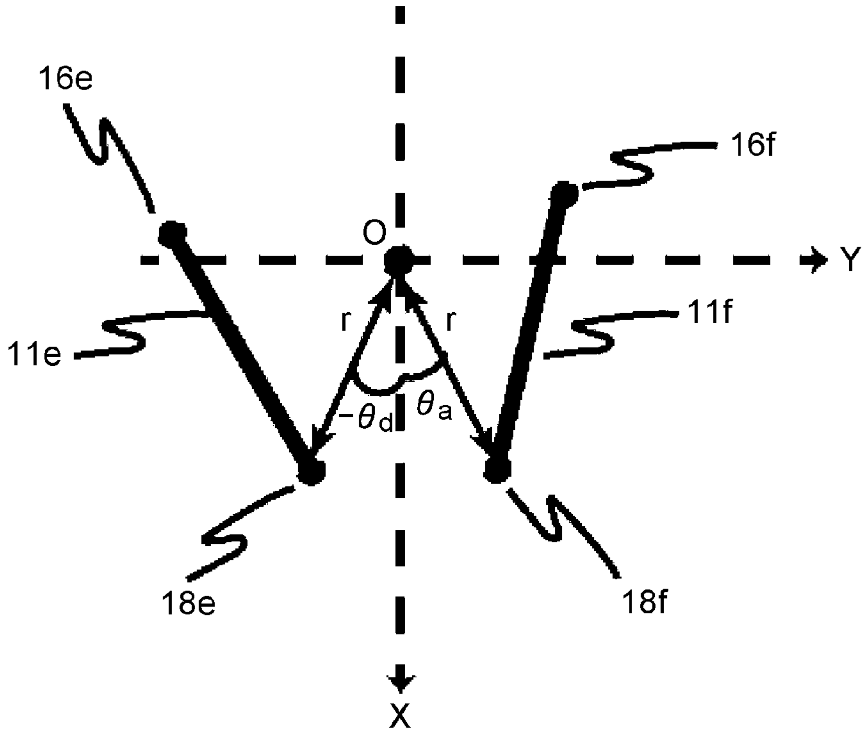
FIG. 13 is a diagram illustrating the arrangement of wires in the embodiment of the present disclosure.

FIG. 13 illustrates the arrangement of the left and right wires 11*e* and 11*f* of the right ankle as an example. The same applies to the left thigh, the right thigh, and the left ankle. In the following, a relationship between a left-right torque t and a stiffness target value, that is, a modulus of elasticity K (hereinafter referred to as a stiffness value K) of rotational stiffnesses with respect to a center of rotation O, which are generated by both the wire 11*e* and the wire 11*f*, will be described with reference to FIG. 13. The left-right torque τ and the stiffness value K of the thigh or ankle of each leg in the wires 10 or 11, which is generated by the other motors 13 or 14, can also be determined in a similar way.

In FIG. 13, O denotes a center of leftward and rightward rotations viewed from the front of the right ankle joint (in the case of a thigh, a hip joint) of the user 100, 18*e* denotes a lower-end ankle wire attachment unit serving as the point of application for the ankle wire 11*e* on the outer side of the right ankle, 18*f* denotes a lower-end ankle wire attachment unit serving as the point of application for the ankle wire 11*f* on the inner side of the right ankle, 16*e* denotes a starting point of the ankle wire 11*e*, 16*f* denotes a starting point of the ankle wire 11*f*, *r* denotes a distance between the point O and the point 16*e* (in other words, the distance between the point O and the point 16*f*), $\theta_a$ denotes an angle defined by a line segment O-16*e* and the X axis, and $\theta_d$ denotes an angle defined by a line segment O-16*f* and the X axis. $x_{A0}$ and $y_{A0}$ denote the x coordinate and the y coordinate of the point 16*e*, respectively. The distance r, the position of the point 16*e*, and the position of the point 16*f* are calculated in advance from design values of the assist pants 2*a* and are stored in the motor setting unit 26.

At this time, a torque $\tau_a$ relative to the center of rotation O, which is generated in the ankle wire 11*e*, is given by the following equation.

If $$f(\theta_a) = \sqrt{x_{A0}^2 + y_{A0}^2 + r^2 - 2r(x_{A0}\cos\theta_a + y_{A0}\sin\theta_a)} \quad \text{(Eq. 1)}$$

then, $$\tau_a = K_a\{r(y_{A0}\cos\theta_a - x_{A0}\sin\theta_a)\cdot(f(\theta_a) - l_a)\} \quad \text{(Eq. 2)}$$

where $K_a$ is the modulus of elasticity of the wire 11*e* in the linear movement direction, and $l_a$ is the natural length $L_0$ of the wire 11*e*. The modulus of elasticity $K_{\theta a}$ of the wire 11*e* in the rotation direction is given by the following equation.

$$K_{\theta a} = K_a\left\{r(l_a - f(\theta_a))(y_{A0}\sin\theta_a + x_{A0}\cos\theta_a) - \frac{r^2}{f(\theta_a)}(y_{A0}\cos\theta_a - x_{A0}\sin\theta_a)^2\right\} \quad \text{(Eq. 3)}$$

Further, the left-right torque τ relative to the center of rotation O, which is generated by both the wire 11*e* and the wire 11*f*, is given by $$\tau = \tau_a - \tau_b, \quad \text{(Eq. 4)}$$

where $\tau_b$ denotes a torque generated by the wire 11*f* relative to the center of rotation O and can be calculated in a way similar to that for $\tau_a$. The stiffness value K relative to the center of rotation O, which is generated by both the wire 11*e* and the wire 11*f*, can be represented by $$K = K_{\theta a} - K_{\theta d}, \quad \text{(Eq. 5)}$$

where $K_{\theta d}$ is a modulus of elasticity of the wire 11*f* in the rotation direction and can be calculated in a way similar to that for $K_{\theta a}$.

If there is not need to generate a difference in the left-right direction, the following equation is used.

$$K_{\theta d} = K_{\theta a} \quad \text{(Eq. 6)}$$

The moduli of elasticity $K_a$ and $K_d$ in the linear movement direction are calculated by using Eqs. 1 to 6 above and are output as the respective motor control signals of the motors. Specifically, $K_a$ represents a motor control signal $K_{14f}$ for the motor 14*f*, and $K_d$ represents a motor control signal $K_{14e}$ for the motor 14*e*.

Eq. 6 is not limited to that given above. For example, $K_{\theta d} = 2K_{\theta a}$ or the like may be used depending on, for example, conditions of the road surface, the characteristics of joints of a person, and so on, in which case calculation can be performed in a similar way.

Figure 14:
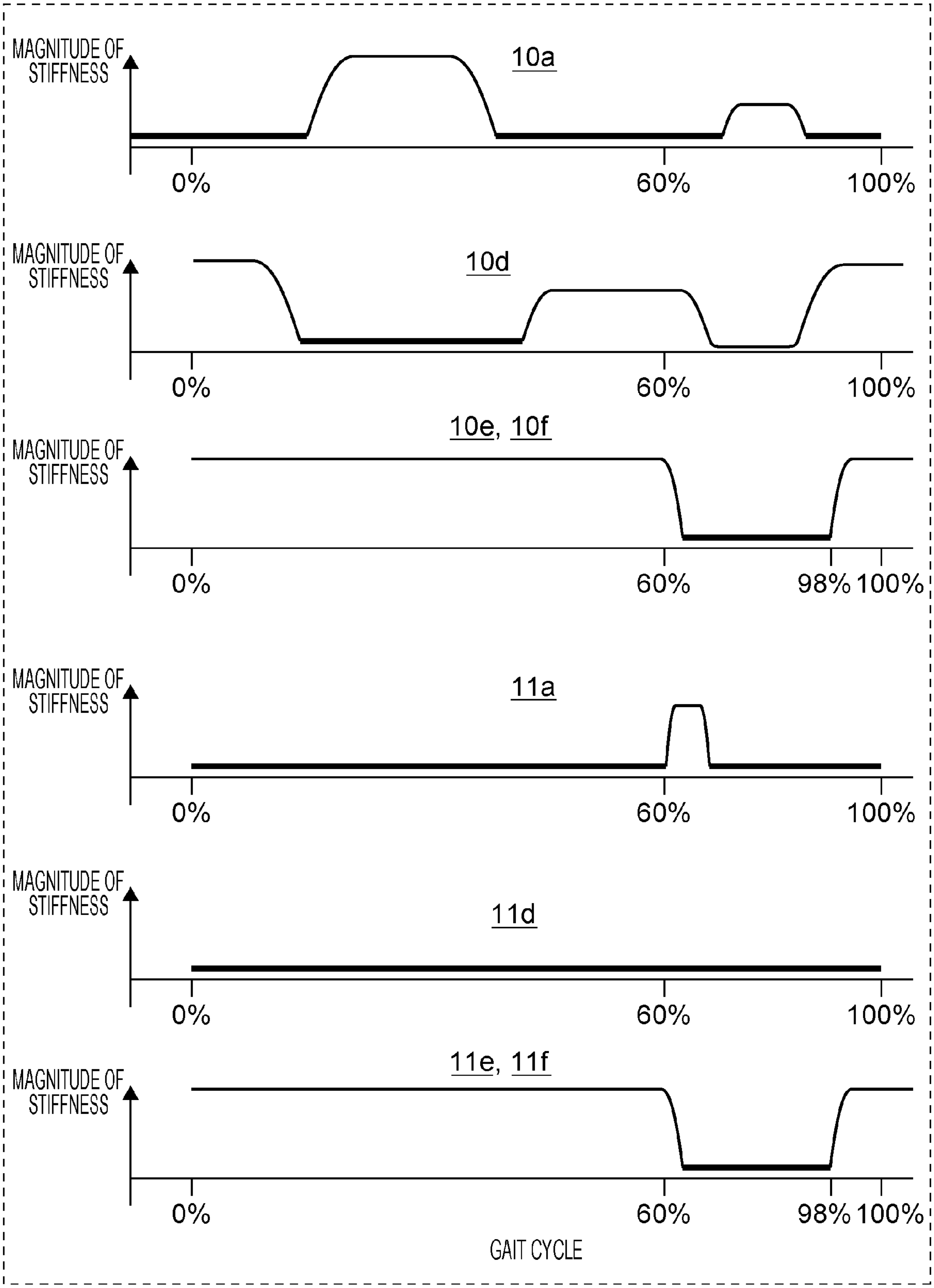
FIG. 14 is a diagram illustrating example timing charts of target moduli of elasticity of respective wires in the embodiment of the present disclosure.

FIG. 14 illustrates an example relationship between the gait cycle of the right leg and the stiffness target value of the thigh wires 10 or the ankle wires 11. In FIG. 14, the horizontal axis represents the gait cycle of the right leg and the vertical axis represents the magnitude of the stiffness target value. The third graph in FIG. 14 illustrates an example relationship between the gait cycle and the stiffness target value of the thigh wires 10*e* and 10*f*. The sixth graph in FIG. 14 illustrates an example relationship between the gait cycle and the stiffness target value of the ankle wires 11*e* and 11*f*. The first and second graphs in FIG. 14 illustrate example relationships between the gait cycle and the stiffness target value of front and back wires 10*a* and 10*d* of the thigh of the right leg according to a modification described below. The fourth and fifth graphs in FIG. 14 illustrate example relationships between the gait cycle and the stiffness target value of front and back wires 11*a* and 11*d* of the right ankle according to the modification described below.

As illustrated in the third graph from the top in FIG. 14, in the transverse direction of the thighs, only stiffness is assisted without generating an assistance torque. Thus, the first stiffness target value output unit 24 performs control to increase the moduli of elasticity, which simulate virtual spring stiffnesses, of the left and right thigh wires 10 of a leg, namely, the thigh wires 10*e* and 10*f* on the outer side and inner side of the right leg, at the same time to increase the left-right stiffness for the thigh of the right leg. As an example, the moduli of elasticity of the pair of thigh wires 10*e* and 10*f* are set to the same value so that the same stiffness can be imparted to the thigh wires 10*e* and 10*f* on the outer side and inner side of the right leg. The same applies to the left leg.

As illustrated in the sixth graph from the top in FIG. 14, also in the transverse direction of the ankles, only stiffness is assisted without generating an assistance torque. Thus, the first stiffness target value output unit 24 performs control to increase the stiffness target values of the left and right ankle wires 11 of a leg, namely, the ankle wires 11*e* and 11*f* on the outer side and inner side of the right ankle, at the same time to increase the stiffnesses to be transmitted to the left side surface and right side surface of the ankle of the right leg. As an example, the moduli of elasticity of the pair ankle wires 11*e* and 11*f* are set to the same value so that the same stiffness can be imparted to the ankle wires 11*e* and 11*f* on the outer side and inner side of the right leg. The same applies to the left leg.

The motor control unit 27 controls a pair of motors 13 or a pair of motors 14 on the basis of the stiffness target value input from the motor setting unit 26. As a result, for example, the first stiffness target value output unit 24 can control a tension, with the stiffness for a pair of wires 10 or a pair of wires 11 being simulated as virtual springs for each of the left and right feet, so that the stiffnesses to be transmitted to the left side surface and right side surface of the thigh or ankle in a period from when the heel of the foot contacts the ground to when the heel of the foot completely leaves the contact surface 90 are greater than the stiffnesses in any other period (see, for example, the third graph depicting the pair of wires 10*e* and 10*f* or the sixth graph depicting the pair of wires 11*e* and 11*f* in FIG. 14). That is, the first stiffness target value output unit 24 can decrease the second stiffness target value compared with the first stiffness target value on the basis of the gait cycle information of the user 100 and can also increase the left-right stiffness for each thigh or ankle by changing from the second stiffness target value to the first stiffness target value immediately before the leg contacts the contact surface 90. The first stiffness target value indicates the magnitude of the stiffnesses to be transmitted to the left side surface and right side surface of each thigh or ankle when the foot of the user 100 is in contact with the contact surface 90, and the second stiffness target value indicates the magnitude of the stiffnesses to be transmitted to the left side surface and right side surface of each thigh or ankle when the foot of the user 100 is not in contact with the contact surface 90. In this way, the stiffness target value is changed so as to increase the stiffness for each thigh or ankle in a period from immediately before a foot contacts the contact surface 90 to when the foot leaves the contact surface 90, thereby preventing the user 100 from falling in the left-right direction of each thigh or ankle during walking.

The following more specifically describes the operation of the motor control unit 27.

The motor control unit 27 performs force control calculation by using the stiffness target value in the linear movement direction (in other words, linear-movement moduli of elasticity) Kn input from the motor setting unit 26 to the motor control unit 27 (where n denotes a corresponding motor sign) and the respective motor torques t obtained from a pair of motors 13 or a pair of motors 14 that control the stiffnesses to be transmitted to the left side surface and right side surface of each of the left and right thighs or ankles, so that the pair of wires 10 or the pair of wires 11 corresponding to the pair of motors 13 or the pair of motors 14 each simulates a virtual spring. The target positions of the motors 13 or 14 (in other words, the target positions of the lower ends of the wires 10 or 11) x, which are determined through force control calculation, are respectively output from the motor control unit 27 to the pair of motors 13 or the pair of motors 14. It is common that a motor torque τ can be determined by τ=Kt×i using a motor current i. Kt is a constant unique to each motor.

An example of the force control calculation is as follows.

When a motor torque is represented by τ and the tension of each of wires 10 or 11 that are paired with each other at this time is represented by F, the tension F of each of the paired wires 10 or the paired wires 11 can be determined by the following equation.

$$F=G\tau$$

G denotes a conversion coefficient determined from the gear ratio and the pulley radius $r_p$.

The target positions x of the motors 13 or 14 at this time can be determined as below using the stiffness target value Kn in the linear movement direction.

$$x=(1/G)\times(F/Kn)$$

As a result of the foregoing operation, the target positions x of the motors 13 or 14 are determined and output to the motors 13 or 14 via the input/output IF 41.

The pair of motors 13 or the pair of motors 14 move to the input target positions x of the motors 13 or 14. Thus, each of the paired wires 10 or the paired wires 11 respectively connected to the paired motors 13 or 14 can operate to simulate a virtual spring and can generate a tension equivalent to the tension generated by a spring having the linear-movement stiffness target value Kn.

The foregoing describes an example in which a pair of motors 13 or a pair of motors 14 operates in position control. Operation in torque control can also be implemented in a similar way.

Figure 15A:
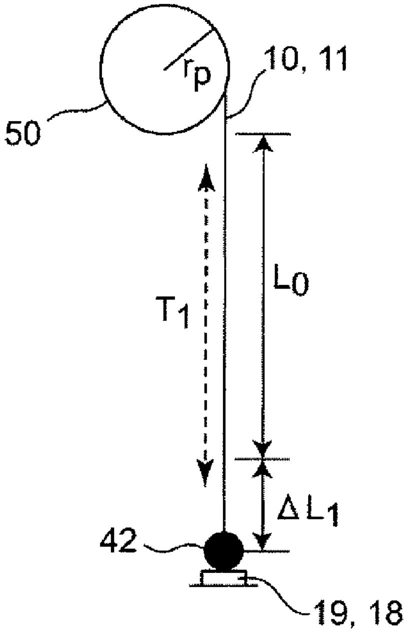
FIG. 15A is a diagram illustrating the operation of a motor control unit in the embodiment of the present disclosure.
Figure 15B:
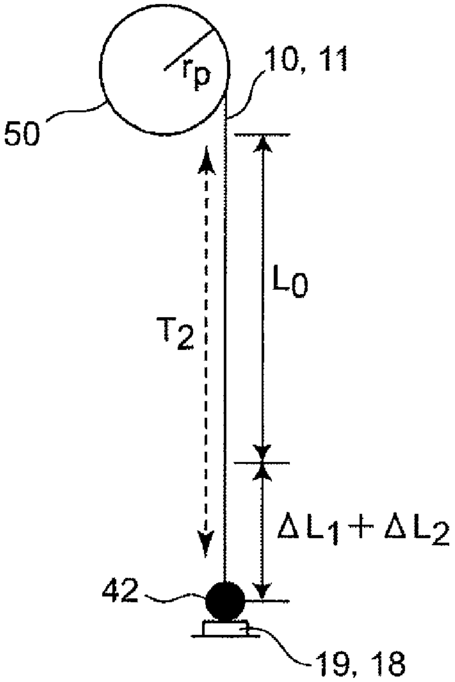
FIG. 15B is a diagram illustrating the operation of the motor control unit in the embodiment of the present disclosure.

FIG. 15A and FIG. 15B are diagrams schematically illustrating the operation of the motor control unit 27. The tension of each wire 10 or 11 can be detected by a force sensor 42, such as a strain gage or a torque sensor. A strain gage as an example of the force sensor 42 can be located, for example, in the middle of the wire 10 or 11 or between an end of the wire 10 or 11 and the lower-end thigh wire attachment unit 19 or the lower-end ankle wire attachment unit 18 (see FIG. 15A and FIG. 15B) to detect the tension generated in the wire 10 or 11. Further, an amount of change ΔL in the length L of the wire 10 or 11 can be determined as follows. The rotational speed of the pulley 50 is detected by using the encoder 51 of the motor 13 or 14. Since the radius $r_p$ of the pulley 50 is known, computation using the radius $r_p$ and the rotational speed is performed to determine the amount of change ΔL of the length L of the wire 10 or 11 wound up on the pulley 50.

In the motor control unit 27, as illustrated in FIG. 15A, the natural length La of a virtual spring is determined in advance. That is, when the length L of the wire 10 or 11 is equal to $L_0$, the tension F generated in the wire 10 or 11 is 0. When the user 100 wears the assist ankle bands 2*b* and 2*c* or the assist pants 2*a* as the assist garment 72 with the wires 10 or 11 being worn at positions longer than the wire length $L_0$ of the wires, the wires 10 or 11 are pulled out from the pulleys 50. At this time, in the case of the linear-movement stiffness target value Kn, if the tension F generated in the motor 13 or 14 is $T_1$, the target position x of the motor 13 or 14 is determined so that the wire 10 or 11 has a length given by $L_0+\Delta L_1$.

In this case, $$\Delta L_1=T_1/Kn.$$

When the gear ratio is 1 and the radius of the pulley 50 is represented by $r_p$, the conversion coefficient G is given by $2\pi r_p$. Thus, the target position x of the motor 13 or 14 is represented by $$x=\{1/(2\pi r_p)\}\times\Delta L_1.$$

Next, a case is considered in which when the user 100 wearing the assist garment 72 is moving by walking, running, or the like, the stiffnesses to be transmitted to the left side surface and right side surface of the thighs or ankles of the left and right legs are increased in accordance with the conditions of the contact surface 90 to prevent falling. At this time, as illustrated in FIG. 15B, it is considered that the tension F generated in the wire 10 or 11 is changed from $T_1$ to $T_2$.

At this time, the length L of the wire 10 or 11 is given by $L_0+\Delta L_1+\Delta L_2$, where $\Delta L_2$ can be calculated by the following equation.

$$\Delta L_2=T_2/Kn$$

At this time, the target position x of the motor 13 or 14 is represented by $$x=\{1/(2\pi r_p)\}\times(L_0+\Delta L_2).$$

When the motor 13 or 14 is operating in torque control, the motor control unit 27 performs force control using the linear-movement stiffness target value Kn input from the motor setting unit 26 and the target position x, which is position information of the motor 13 or 14 obtained from the motor 13 or 14, so that the wire 10 or 11 can operate to simulate a virtual spring. To this end, the motor control unit 27 calculates the motor torque $\tau$ and outputs the motor torque $\tau$ to the motor 13 or 14.

The motor control unit 27 controls the forward and reverse rotation operation of the motor 13 or 14 to implement the motor torque $\tau$ determined through calculation, thereby tightening or loosening the wire 10 or 11 connected to the motor 13 or 14 so as to simulate a virtual spring. As a result, a tension equivalent to the tension generated by a spring having the linear-movement stiffness target value Kn can be generated in the wire 10 or 11.

Figure 16A:
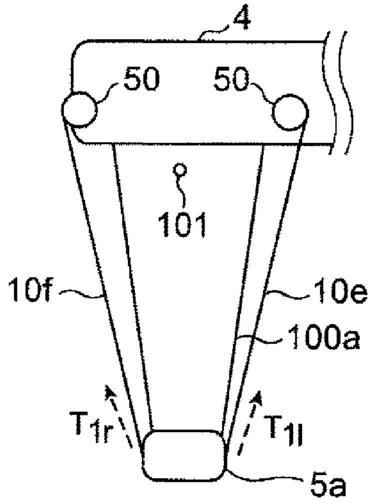
FIG. 16A is a diagram illustrating the operation of an assist system in the embodiment of the present disclosure.
Figure 16B:
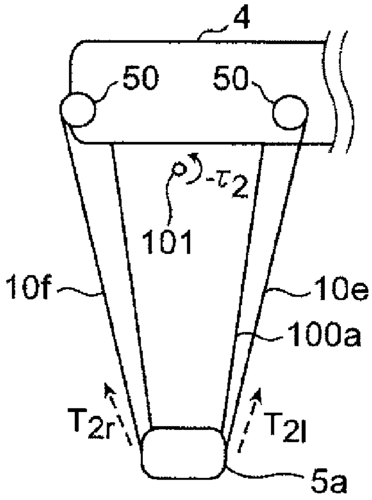
FIG. 16B is a diagram illustrating the operation of the assist system in the embodiment of the present disclosure.
Figure 16C:
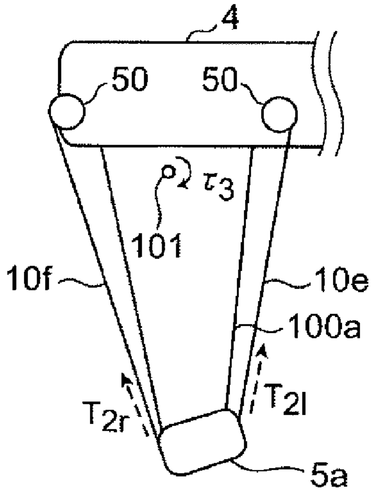
FIG. 16C is a diagram illustrating the operation of the assist system in the embodiment of the present disclosure.

FIG. 16A to FIG. 16C are diagrams illustrating how an assist system operates in a portion of the right thigh. In FIG. 16A, a tension generated in the thigh wire 10*f* is represented by $T_{1r}$ and a tension generated in the thigh wire 10*e* is represented by $T_{1l}$. The torques generated by the respective tensions with respect to a center of rotation 101 of the hip joints are represented by $\tau_0$ and $-\tau_0$, which are in balance with each other. At this time, no torque is exerted to cause the thighs to rotate to the left and right.

Then, it is assumed that, for example, the user 100 places their foot on a step, thereby exerting a torque $-\tau_2$ on the center of rotation 101 for the thigh (the state in FIG. 16B). As a result, the tension exerted on the thigh wire 10*f* becomes $T_{2r}$, and the tension exerted on the thigh wire 10*e* becomes $T_{2l}$. At this time, the tensions have the following relationship.

$$T_{1r}<T_{2r}, T_{1l}>T_{2l}$$

If a linear-movement stiffness target value that is set for the thigh wire 10*f* is represented by $K_1$ and a stiffness target value that is set for the thigh wire 10*e* is represented by $K_2$, regarding the thigh wire 10*f* and the thigh wire 10*e*, the amounts of changes $\Delta L_r$ and $\Delta L_l$ of the target lengths of the wires 10*f* and 10*e* can be calculated using the following equations.

$$\Delta L_r=(T_{2r}-T_{1r})/K_1, \Delta L_l=(T_{2l}-T_{1l})/K_2$$

The motors 13*f* and 13*e* individually operate in accordance with the target lengths of the wires 10*f* and 10*e* to change the lengths of the wires 10*f* and 10*e*. The thigh wire 10*f* is pulled out and the thigh wire 10*e* is wound up. As a result, as illustrated in FIG. 16C, the hip joints are adducted. Further, due to the tension of the thigh wire 10*f*, the torque exerted on the center of rotation 101 of the hip joints becomes $\tau_{3r}$, and, likewise, due to the tension of the thigh wire 10*e*, the torque exerted on the center of rotation 101 of the hip joints becomes $\tau_{3l}$ (<0). Since the torques generated by the left and right thigh wires 10*f* and 10*e* differ, the balance is disrupted and a torque given by $\tau_3=\tau_{3r}+\tau_{3l}$ is generated in the hip joints. The torque $\tau_3$ is directed opposite to the torque $-\tau_2$, which is generated in the hip joints because a foot is placed on a step. Since the torque $\tau_3$ and the torque $-\tau_2$ are canceled out, the adduction angle of the hip joints becomes smaller than that when the assist system is not used. If no torque is exerted from outside, the balanced state, that is, the state illustrated in FIG. 16A, can be obtained again.

As described above, according to the embodiment, in the first example or the third example, the pair of ankle wires 11*e* and 11*f*, which are located in corresponding portions of the right side surface and left side surface of the right ankle of the user 100 in the longitudinal direction of the right leg of the user 100 and extend through the lower-end ankle outer wire attachment units 16*e* and 16*f* of the right upper ankle belt 6*a*, with the lower ends thereof being coupled to the lower-end ankle wire attachment units 18*e* and 18*f* of the right heel belt 7*a*, and the pair of ankle wires 11*g* and 11*h*, which are located in corresponding portions of the right side surface and left side surface of the left ankle of the user 100 in the longitudinal direction of the left leg of the user 100 and extend through the lower-end ankle outer wire attachment units 16*g* and 16*h* of the left upper ankle belt 6*b*, with the lower ends thereof being coupled to the lower-end ankle wire attachment units 18*g* and 18*h* of the left heel belt 7*b*, are included. In the second example or the third example, the thigh wires 10*e* and 10*f* included in the assist pants body 2*d*, which are located in corresponding portions of the outer side of the right thigh (the right side surface of the right thigh) and the inner side of the right thigh (the left side surface of the right thigh) of the user 100 and have lower ends coupled to the waist belt 4 and the lower-end thigh wire attachment units 19*e* and 19*f* of the above-knee belt 5*a* of the right leg, and the thigh wires 10*g* and 10*h* included in the assist pants body 2*d*, which are located in corresponding portions of the inner side of the left thigh (the right side surface of the left thigh) and the outer side of the left thigh (the left side surface of the left thigh) of the user 100 and have lower ends coupled to the waist belt 4 and the lower-end thigh wire attachment units 19*g* and 19*h* of the above-knee belt 5*b* of the left leg, are included. Further, the control device 3 independently controls the forward and reverse rotation operations of the motors 14 or 13 to adjust the respective lengths of the wires 11 or 10 on the basis of the user information obtained by the user information input unit 12, and the walk information from the foot sensors 8a and 8b to adjust the stiffnesses to be transmitted to the left side surface and right side surface of each ankle or thigh, which are to be imparted to the wires 11 or 10. That is, for example, the first stiffness target value output unit 24 changes, for each of the left and right feet, the stiffnesses to be transmitted to the left side surface and right side surface of the ankle or thigh in a period from 0% of the gait cycle, at which the heel of the foot contacts the ground, to 60% of the gait cycle, at which the foot completely leaves the contact surface 90, to be larger than the stiffnesses in any other period. As a result, the user 100 can be prevented from falling in their left-right direction during walking.

As an example, the control device 3 includes the gait cycle estimation unit 20, the assistance strength determination unit 21, the timing determination unit 23, the first stiffness target value output unit 24, the motor setting unit 26, the motor control unit 27, and the fatigue level estimation unit 29. The first stiffness target value output unit 24 determines target values of stiffness for the thighs or ankles in the left-right direction on the basis of the gait cycle information from the gait cycle estimation unit 20, the assistance strength information from the assistance strength determination unit 21, and the stiffness change timing information from the timing determination unit 23. Then, the first stiffness target value output unit 24 controls the motors 13 or 14 connected to the left and right thigh wires 10h, 10f, 10e, and 10g or the left and right ankle wires 11h, 11f, 11e, and 11g by an operation with the motor setting unit 26 and the motor control unit 27. This configuration enables the control device 3 to control the stiffnesses to be transmitted to the left side surfaces and right side surfaces of the thighs or ankles as tensions that simulate those of virtual springs in accordance with the target values. Thus, the assist system 1 can maximally prevent the user 100 to be assisted from falling during walking.

The assistance strength determination unit 21 determines the strength of assistance from the user information and can set the stiffness, which is a type of assistance force, to be higher for a user 100 who needs more assistance. The timing determination unit 23 outputs a signal for increasing the stiffness, based on gait cycle information that is an example of walk information about the user 100, which is output from the gait cycle estimation unit 20, during a period from immediately before a foot of the user 100 contacts the ground to when the foot leaves the contact surface (such as a road surface or a floor surface) 90, thereby preventing the user 100 from falling and, at the same time, preventing hindrance to the mobility of the joints of the foot when the foot is off the ground. Thus, for example, when the user 100 walks on the contact surface 90 with an obstacle while adjusting the location to place their foot on, the user 100 can be prevented from falling without hindrance to the mobility of their foot.

The embodiment described above describes, as a non-limiting example, walking assist pants for assisting in the left-right stiffness for the thighs and ankle joints.

The embodiment described above describes the foot sensors 8a and 8b as a non-limiting example of a walk information obtaining device included in the input interface unit 200 for obtaining walk information. For example, angle sensors attached to the assist pants 2a or the assist ankle bands 2b and 2c may be used.

The embodiment described above describes, as a non-limiting example, stiffness assistance for both the left and right legs. Only one leg may be assisted. This embodiment is feasible for assistance of only one leg in an example where, for example, it is difficult to attach the assist system 1 to one foot which is injured.

As described above, in the embodiment described above, the left-right stiffness of the user 100 is increased during a period from immediately before a foot of the user 100 contacts the ground to when the foot leaves the contact surface 90, thereby preventing the user 100 from falling and, at the same time, preventing hindrance to the mobility of the joints of the leg when the leg is off the ground. Thus, for example, in a case where the user 100 walks on the contact surface 90 with an obstacle while adjusting the location to place their foot on, the user 100 can be prevented from falling without hindrance to the mobility of their leg.

Modifications

Figure 17:
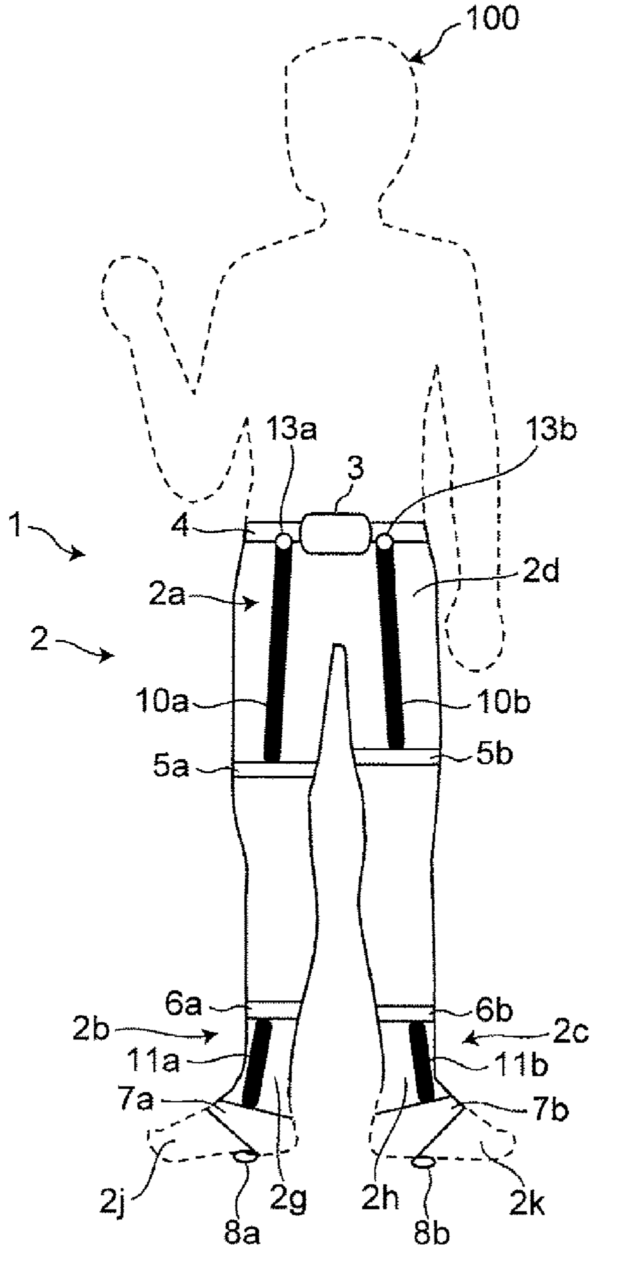
FIG. 17 is a diagram illustrating an overview of an assist system in a modification of the embodiment of the present disclosure.
Figure 18:
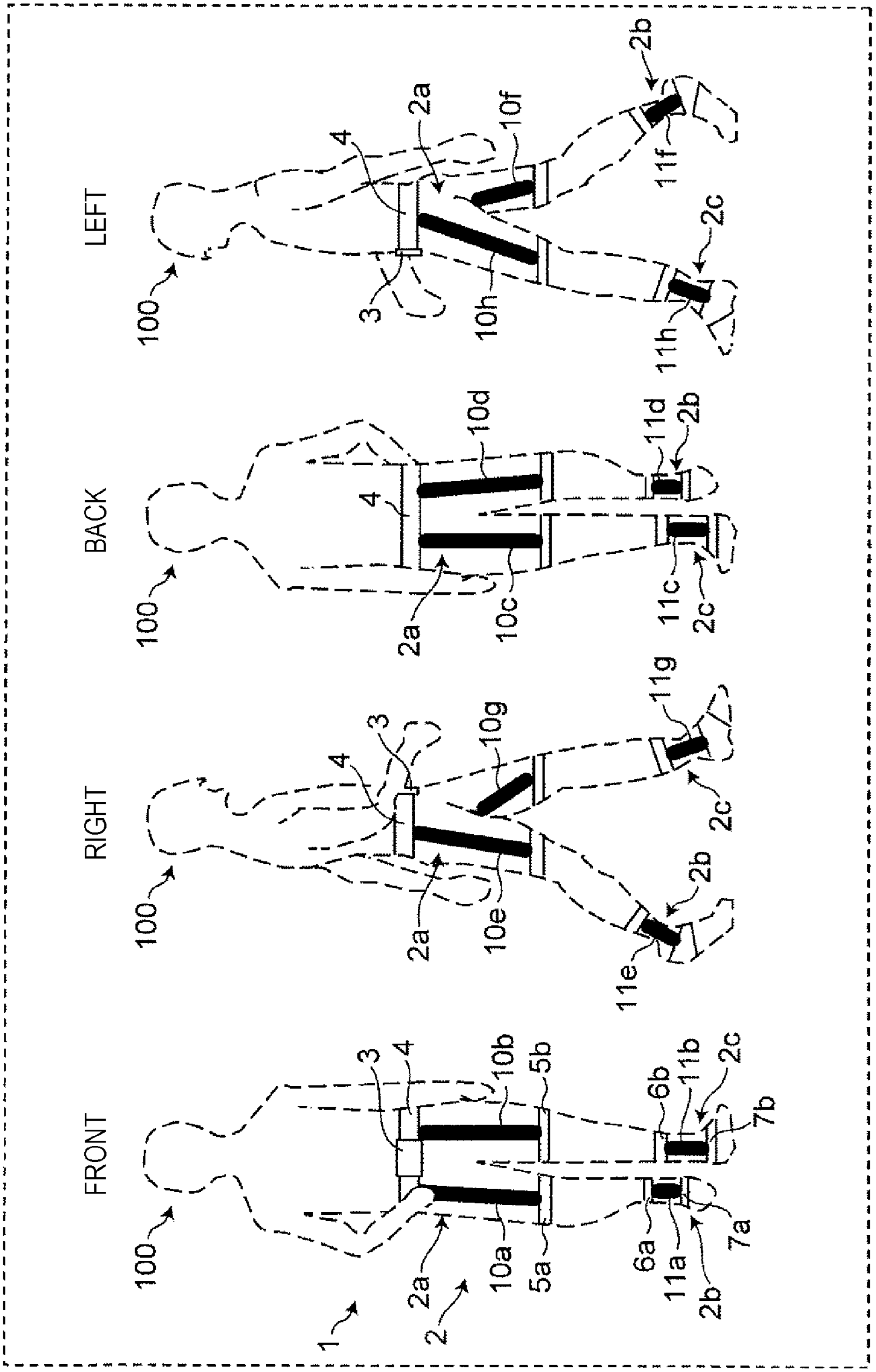
FIG. 18 is a diagram illustrating the arrangement of wires in assist pants in the modification of the embodiment of the present disclosure.
Figure 19:
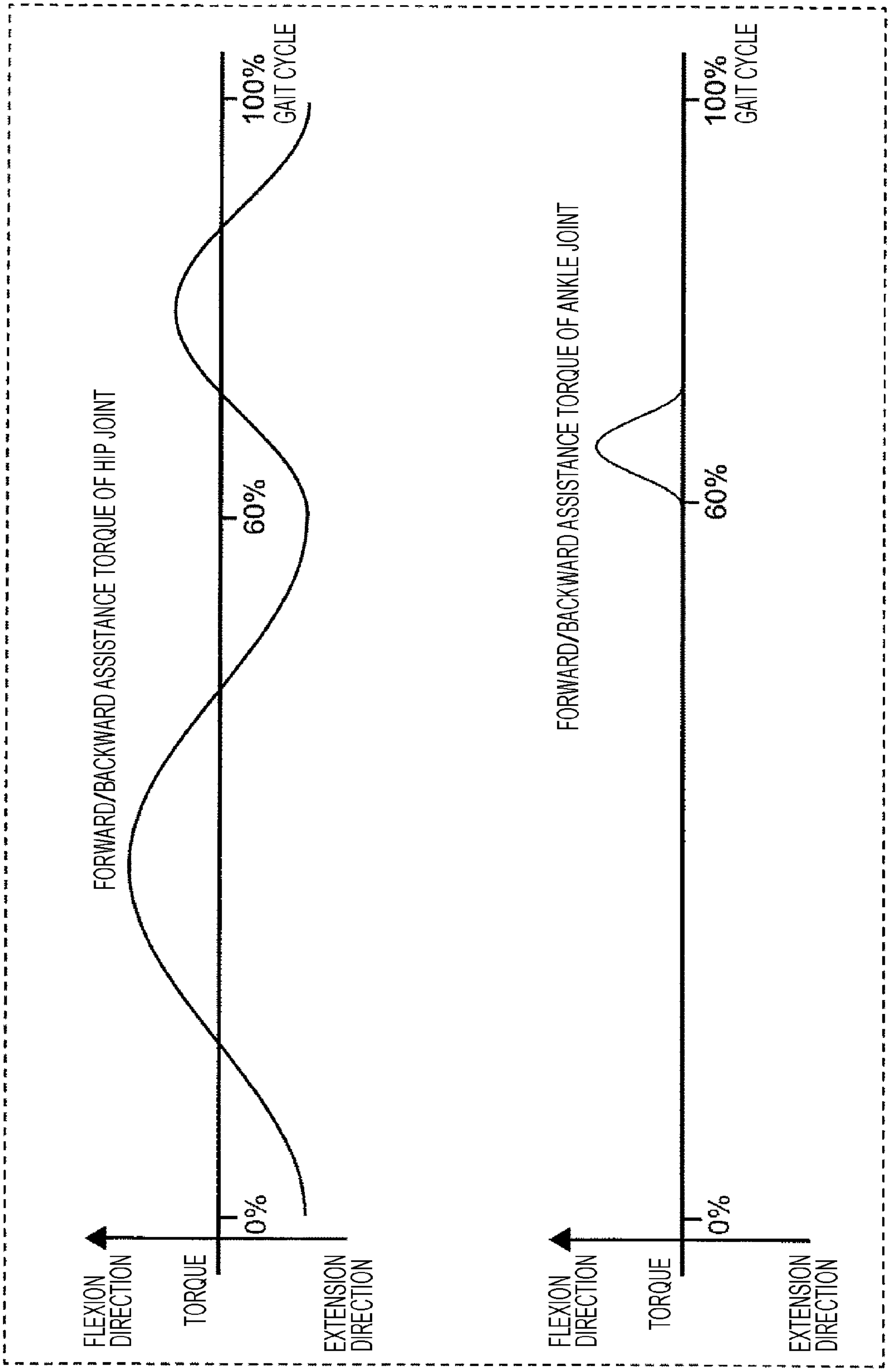
FIG. 19 is a diagram illustrating example torques of a thigh and an ankle joint in the modification of the embodiment of the present disclosure.

As a modification of the embodiment, a function of assisting the user 100 in their walking activities in the forward-backward direction may be added. In this case, as illustrated in FIG. 17, FIG. 18, and FIG. 19, the thigh wires 10 may additionally include front and back wires 10a and 10d of the thigh of the right leg and front and back wires 10b and 10c of the thigh of the left leg. Further, the motors 13 may additionally include motors 13a, 13d, 13b, and 13c respectively corresponding to the wires 10a, 10d, 10b, and 10c. For similar purposes, the ankle wires 11 may further include front and back wires 11a and 11d of the right ankle and front and back wires 11b and 11c of the left ankle. Further, the motors 14 may further include motors 14a, 14d, 14b, and 14c respectively corresponding to the wires 11a, 11d, 11b, and 11c. Each of the additional wires has an end to which the corresponding one of the additional motors is connected. The control device 3 performs control to independently control the additional motors 13a, 13d, 13b, and 13c and the additional motors 14a, 14d, 14b, and 14c on the basis of user information and walk information, thereby changing the forward/backward assistance forces of the thighs or the ankles.

Figure 20:
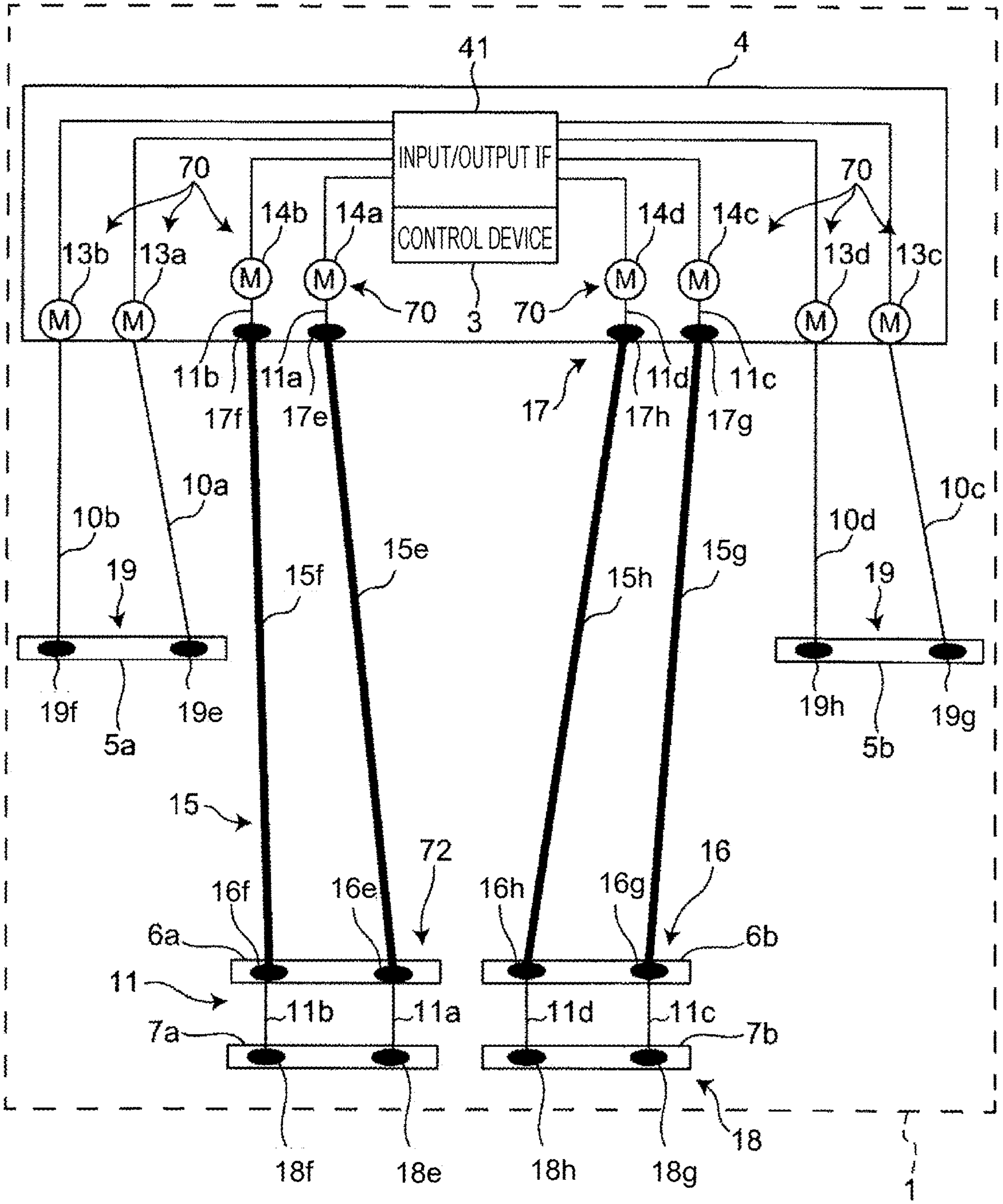
FIG. 20 is an explanatory diagram illustrating the configuration of an apparatus for fall prevention during walking in the modification of the embodiment of the present disclosure.

Specifically, as illustrated in FIG. 17, FIG. 18, and FIG. 20, the assist pants 2a include, as the additional thigh wires 10, the thigh wires 10a and 10b on the front side, which are located in portions of the assist pants body 2d corresponding to anterior surfaces of the right leg and left leg, and the thigh wires 10d and 10c on the back side, which are located in portions corresponding to posterior surfaces of the right leg and the left leg. Further, the assist ankle bands 2b and 2c include, as the additional ankle wires 11, the ankle wires 11a and 11b on the front side, which are located in portions corresponding to anterior surfaces of the ankles between the upper ankle belts 6a and 6b and the heel belts 7a and 7b, and the ankle wires 11d and 11c on the back side, which are located in portions corresponding to posterior surfaces of the ankles between the upper ankle belts 6a and 6b and the heel belts 7a and 7b. Note that elements similar to those illustrated in FIG. 2, such as the ankle outer wires 15, the lower-end ankle outer wire attachment units 16, the upper-end ankle outer wire attachment units 17, the lower-end ankle wire attachment units 18, and the lower-end thigh wire attachment units 19, are assigned similar numerals and will not be described herein.

The thigh wires 10a and 10d are in antagonistic relation to each other, and the thigh wires 10b and 10c are in antagonistic relation to each other. The control device 3 performs operation control to drive the pair of thigh wires 10a and 10d on the front side and back side of the right leg, which are in antagonistic relation to each other, to be pulled apart from each other, thereby allowing a forward/backward torque of the right thigh to be generated in the thigh of the right leg. Further, the control device 3 performs operation control to drive the pair of thigh wires 10*b* and 10*c* on the front side and back side of the left leg, which are in antagonistic relation to each other, to be pulled apart from each other, thereby allowing a forward/backward torque of the left thigh to be generated in the thigh of the left leg.

Also for the ankle wires 11, the ankle wires 11*a* and 11*d* are in antagonistic relation to each other, and the ankle wires 11*b* and 11*c* are in antagonistic relation to each other. The control device 3 performs operation control to drive the pair of right ankle wires 11*a* and 11*d*, which are in antagonistic relation to each other, to be pulled apart from each other, thereby generating a forward/backward torque of the right ankle. Further, the control device 3 performs operation control to drive the pair of left ankle wires 11*b* and 11*c*, which are in antagonistic relation to each other, to be pulled apart from each other, thereby generating a forward/backward torque of the left ankle.

In this modification, as an example, the control device 3 can further include the torque target value setting unit 25 and the second stiffness target value output unit 28 for walking assistance.

The torque target value setting unit 25 outputs a torque target value for assisting in walking on the basis of the gait cycle information output from the gait cycle estimation unit 20. The torque target value setting unit 25 stores in advance target torque values for the gait cycle information, determines torque values for assisting in walking, that is, target values of torque in the sagittal direction for moving the left and right legs in the forward-backward direction, on the basis of the target torque values, and outputs the determined target values of torque in the sagittal direction to the motor setting unit 26. The torques in the sagittal direction for moving the left and right legs in the forward-backward direction refer to the forward/backward torque of the right thigh, which is generated by the pair of thigh wires 10*a* and 10*d*, the forward/backward torque of the left thigh, which is generated by the pair of thigh wires 10*b* and 10*c*, the forward/backward torque of the right ankle joint, which is generated by the pair of ankle wires 11*a* and 11*d*, and the forward/backward torque of the left ankle joint, which is generated by the pair of ankle wires 11*b* and 11*c*. The torque target value setting unit 25 outputs the torque target value 0 for the motion in the frontal direction. FIG. 19 illustrates graphs of wires of the right foot, depicting torques for generating a forward and backward swing of the foot, which differs in timing from transverse stiffness.

The upper and lower graphs in FIG. 19 are diagrams illustrating an example of torque target values for the forward and backward movement of the right hip joint, or the thigh, and the ankle joint (in other words, the forward/backward assistance torque of the thigh and the forward/backward assistance torque of the ankle joint), respectively, and depict torques for generating forward and backward swing of the right foot. The forward/backward assistance torque of the thigh refers to an assistance torque for the forward and backward movement of the thigh, which is generated by the pair of wires 10*a* and 10*d* and the pair of wires 10*b* and wire 10*c*. The forward/backward assistance torque of the ankle joint refers to an assistance torque for the forward and backward movement of the ankle joints, which is generated by the pair of wires 11*a* and 11*d* and the pair of wires 11*b* and 11*c*. In the example in FIG. 19, the pair of wires 10*a* and 10*d* and the pair of wires 10*b* and 10*c* cause the left foot to flex and then extend during a period within the gait cycle from when the left foot contacts the contact surface 90 to when the foot leaves the contact surface 90 to generate an assistance force. Likewise, the pair of wires 11*a* and 11*d* and the pair of wires 11*b* and 11*c* cause the left ankle to flex during a period within the gait cycle from when the left foot contacts the contact surface 90 to when the foot leaves the contact surface 90 to generate an assistance force.

The second stiffness target value output unit 28 determines a stiffness target value for the movement in the sagittal direction on the basis of the gait cycle information output from the gait cycle estimation unit 20, and the determined stiffness target value for the movement in the sagittal direction is output from the second stiffness target value output unit 28 to the motor setting unit 26. The stiffness target value for the movement in the sagittal direction is determined in advance as a function of the gait cycle information and is stored in the second stiffness target value output unit 28.

As in the previous embodiment, the motor setting unit 26 sets the setting values of the motors 13 and 14 corresponding to the thigh and ankle wires 10 and 11 on the basis of the target values of stiffness output from the second stiffness target value output unit 28 and the torque target values output from the torque target value setting unit 25 in addition to the target values of stiffness output from the first stiffness target value output unit 24, and the set values of the motors 13 and 14 corresponding to the thigh and ankle wires 10 and 11 are output from the motor setting unit 26 to the motor control unit 27.

The first, second, fourth, and fifth graphs in FIG. 14 illustrate example relationships between the gait cycles of the thigh wires 10*a*, 10*d*, 11*a*, and 11*d* of the right foot and the target moduli of elasticity of stiffnesses to be simulated, respectively.

As depicted in the first and second graphs in FIG. 14, the wires 10*a* and 10*d* are wires for assisting in the forward/backward torque of the thigh and stiffness simulated as spring stiffness. In the example, stiffness is simulated as spring stiffness in the forward-backward direction but is not assisted, whereas only the torque is assisted. In this case, the first stiffness target value output unit 24 performs control to increase the tension of the wire 10*d*, which is a wire on the back side of the thigh, when an assistance torque in an extension direction in which the leg is swung backwards is necessary on the basis of information about the gait cycle, and to increase the tension of the wire 10*a*, which is a wire on the front side of the thigh, when an assistance torque in an opposite direction is necessary on the basis of the information about the gait cycle.

As depicted in the fourth and fifth graphs FIG. 14, also for the ankle, when generating an assistance torque for causing the ankle to flex, the first stiffness target value output unit 24 performs control to increase the tension of the wire 11*d*, which is a wire on the back side of the ankle, when an assistance torque in an extension direction in which the ankle is flexed backwards is necessary on the basis of information about the gait cycle, and to increase the tension of the wire 11*a*, which is a wire on the front side of the ankle, when an assistance torque in an opposite direction is necessary on the basis of the information about the gait cycle.

According to this modification, forward-backward assistance provided to the user 100 while walking and assistance for the stiffnesses on the left side surface and right side surface of the intended portion of the user can be achieved at the same time.

Figure 21:
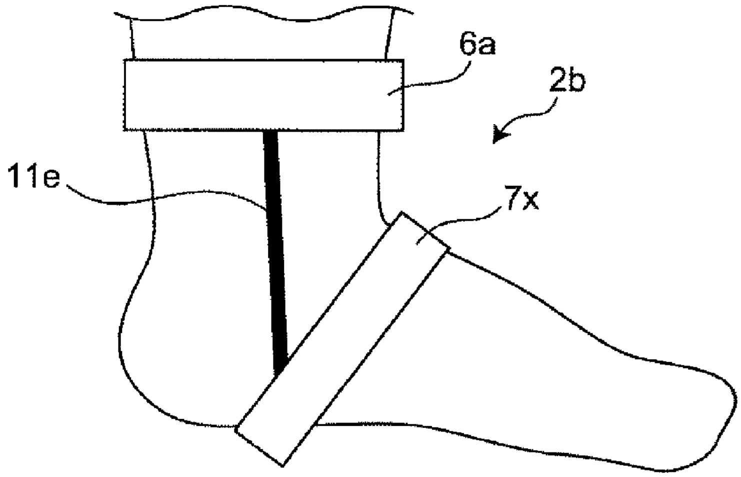
FIG. 21 is an explanatory diagram illustrating another example lower ankle belt of the apparatus for fall prevention during walking in the modification of the embodiment of the present disclosure.

FIG. 21 is an explanatory diagram illustrating another example of a lower ankle belt of the apparatus for fall prevention during walking. The lower ankle belt is not limited to the heel belt 7*a*, which extends across the heel, but may be a lower ankle belt 7x extending from the instep to a portion closer to the toe, rather than extending across the heel.

Further, the tension application mechanism 70 that applies a tension has been described in the embodiment described above in the context of the configuration of the motor 14 and the like, as a non-limiting example. A linear actuator can also achieve similar operational effects.

While the present disclosure has been described with reference to an embodiment and a modification, it goes without saying that the present disclosure is not limited to the embodiment and modification described above. Following configurations are also included in the present disclosure.

The entirety or part of the control device 3 is a computer system including, specifically, a microprocessor, a ROM, a RAM, a hard disk unit, and so on. The RAM or the hard disk unit stores a computer program. The microprocessor operates in accordance with the computer program, thereby allowing each unit to achieve its function. The computer program is constituted by a combination of multiple command codes for providing instructions to a computer to achieve a predetermined function.

For example, a software program recorded on a recording medium such as a hard disk or a semiconductor memory is read and executed by a program execution unit such as a CPU. Accordingly, each constituent element can be implemented.

Software implementing some or all of the elements constituting a control device according to the embodiment or modification described above includes a program as follows.

That is, this program is a program for causing a computer to execute a control method for an apparatus including belts and wires, the belts including a left upper ankle belt to be fixed on an upper part of a left ankle of a user, a right upper ankle belt to be fixed on an upper part of a right ankle of the user, a left lower ankle belt to be fixed on a lower part of the left ankle of the user, and a right lower ankle belt to be fixed on a lower part of the right ankle of the user, the wires including a first wire coupled to the right upper ankle belt and the right lower ankle belt, a second wire coupled to the right upper ankle belt and the right lower ankle belt, a third wire coupled to the left upper ankle belt and the left lower ankle belt, and a fourth wire coupled to the left upper ankle belt and the left lower ankle belt, at least a portion of the first wire being located along a right side surface of the right ankle, at least a portion of the second wire being located along a left side surface of the right ankle, at least a portion of the third wire being located along a right side surface of the left ankle, at least a portion of the fourth wire being located along a left side surface of the left ankle, the control method including obtaining user information about the user and walk information about walking action of the user; determining, based on the user information and the walk information, a first stiffness target value of the first wire, a second stiffness target value of the second wire, a third stiffness target value of the third wire, and a fourth stiffness target value of the fourth wire; controlling a tension of the first wire using the first stiffness target value; controlling a tension of the second wire using the second stiffness target value; controlling a tension of the third wire using the third stiffness target value; and controlling a tension of the fourth wire using the fourth stiffness target value, wherein the tension of the first wire and the tension of the second wire are controlled at a same time, and the tension of the third wire and the tension of the fourth wire are controlled at a same time.

Another program is a program for causing a computer to execute a control method for an apparatus including belts and wires, the belts including a waist belt to be fixed on a waist of a user, a left above-knee belt to be fixed above a knee of a left leg of the user, and a right above-knee belt to be fixed above a knee of a right leg of the user, the wires including a fifth wire coupled to the waist belt and the right above-knee belt, a sixth wire coupled to the waist belt and the right above-knee belt, a seventh wire coupled to the waist belt and the left above-knee belt, and an eighth wire coupled to the waist belt and the left above-knee belt, at least a portion of the fifth wire being located on a right side surface of a right thigh of the user, at least a portion of the sixth wire being located on a left side surface of the right thigh, at least a portion of the seventh wire being located on a right side surface of a left thigh of the user, at least a portion of the eighth wire being located on a left side surface of the left thigh, the control method including obtaining user information about the user and walk information about walking action of the user; determining, based on the user information and the walk information, a fifth stiffness target value of the fifth wire, a sixth stiffness target value of the sixth wire, a seventh stiffness target value of the seventh wire, and an eighth stiffness target value of the eighth wire; controlling a tension of the fifth wire using the fifth stiffness target value; controlling a tension of the sixth wire using the sixth stiffness target value; controlling a tension of the seventh wire using the seventh stiffness target value; and controlling a tension of the eighth wire using the eighth stiffness target value, wherein the tension of the fifth wire and the tension of the sixth wire are controlled at a same time, and the tension of the seventh wire and the tension of the eighth wire are controlled at a same time.

The program may be downloaded from a server or the like and executed. Alternatively, the program may be executed by reading a program recorded on a predetermined recording medium (for example, an optical disk such as a CD-ROM, a magnetic disk, a semiconductor memory, or the like).

The program may be executed by a single computer or multiple computers. That is, centralized processing or distributed processing may be performed.

Any of the various embodiments or modifications described above may be combined as appropriate to achieve advantages included in each embodiment or modification. In addition, a combination of embodiments, a combination of modifications, or a combination of an embodiment and a modification is possible. Additionally, a combination of features in different embodiments or modifications is also possible.

An apparatus for fall prevention during walking, a control device, a control method, and a program according to the aspects of the present disclosure described above can prevent a user from falling to the left and right in the transverse direction as much as possible, and are suitable for use in an apparatus for fall prevention during walking, which is worn by a user to prevent the user from falling when the user is walking, a control device and control method for the apparatus for fall prevention during walking, and a control program for the apparatus for fall prevention during walking.

What is claimed is:

1. A control method for an apparatus including belts, wires, and a tension controller, the belts being detachably attached to a user, the wires being coupled to the belts, the wires including a first wire to be located along a right side surface of a right ankle of the user, a second wire to be located along a left side surface of the right ankle of the user, a third wire to be located along a right side surface of a left ankle of the user, and a fourth wire to be located along a left side surface of the left ankle of the user, the control method comprising:

obtaining user information of the user and walking information about a walking action of the user;

simultaneously controlling, by the tension controller, a tension of the first wire and a tension of the second wire on the basis of the user information and the walking information; and simultaneously controlling, by the tension controller, a tension of the third wire and a tension of the fourth wire on the basis of the user information and the walking information.

2. The control method according to claim 1, further comprising:

simultaneously controlling, by the tension controller, a tension of a fifth wire and a tension of a sixth wire on the basis of the user information and the walking information; and simultaneously controlling, by the tension controller, a tension of a seventh wire and a tension of an eighth wire on the basis of the user information and the walking information, wherein the wires include the fifth wire to be located along a longitudinal direction of a right side surface of a right thigh of the user, the sixth wire to be located along a longitudinal direction of a left side surface of the right thigh of the user, the seventh wire to be located along a longitudinal direction of a right side surface of a left thigh of the user, and the eighth wire to be located along a longitudinal direction of a left side surface of the left thigh of the user.

3. The control method according to claim 1, wherein the tension controller includes a first tension controller that controls the tension of the first wire, a second tension controller that controls the tension of the second wire, a third tension controller that controls the tension of the third wire, and a fourth tension controller that controls the tension of the fourth wire, and wherein the first tension controller controls the tension of the first wire on the basis of the user information and the walking information, the second tension controller controls the tension of the second wire on the basis of the user information and the walking information, the third tension controller controls the tension of the third wire on the basis of the user information and the walking information, and the fourth tension controller controls the tension of the fourth wire on the basis of the user information and the walking information.

4. A control method for an apparatus including belts, wires, and a tension controller, the belts being detachably attached to a user, the wires being coupled to the belts, the wires including a first wire to be located along a longitudinal direction of a right side surface of a right leg of the user, a second wire to be located along a longitudinal direction of a left side surface of the right leg of the user, a third wire to be located along a longitudinal direction of a right side surface of a left leg of the user, and a fourth wire to be located along a longitudinal direction of a left side surface of the left leg of the user, the control method comprising:

obtaining user information of the user and walking information about a walking action of the user;

simultaneously controlling, by the tension controller, a tension of the first wire and a tension of the second wire on the basis of the user information and the walking information; and simultaneously controlling, by the tension controller, a tension of the third wire and a tension of the fourth wire on the basis of the user information and the walking information.

5. An apparatus comprising:

belts configured to be detachably attached to a user;

wires coupled to the belts;

a tension controller; and an obtainer that obtains user information of the user and walking information about a walking action of the user, wherein the belts include a waist belt to be attached to a waist of the user, a left upper ankle belt to be attached to an upper part of a left ankle of the user, a right upper ankle belt to be attached to an upper part of a right ankle of the user, a left lower ankle belt to be attached to a lower part of the left ankle of the user, and a right lower ankle belt to be attached to a lower part of the right ankle of the user, wherein the wires include a first wire coupled to the waist belt, the right upper ankle belt, and the right lower ankle belt, a second wire coupled to the waist belt, the right upper ankle belt, and the right lower ankle belt, a third wire coupled to the waist belt, the left upper ankle belt, and the left lower ankle belt, and a fourth wire coupled to the waist belt, the left upper ankle belt, and the left lower ankle belt, and wherein the tension controller simultaneously controls a tension of the first wire and a tension of the second wire on the basis of the user information and the walking information, and wherein the tension controller simultaneously controls a tension of the third wire and a tension of the fourth wire on the basis of the user information and the walking information.

6. The apparatus according to claim 5, wherein the first wire to be located along a right side surface of a right ankle of the user, the second wire to be located along a left side surface of the right ankle of the user, the third wire to be located along a right side surface of a left ankle of the user, and the fourth wire to be located along a left side surface of the left ankle of the user.

7. The apparatus according to claim 5, wherein the first wire to be located along a longitudinal direction of a right side surface of a right leg of the user, the second wire to be located along a longitudinal direction of a left side surface of the right leg of the user, the third wire to be located along a longitudinal direction of a right side surface of a left leg of the user, and the fourth wire to be located along a longitudinal direction of a left side surface of the left leg of the user.

8. The apparatus according to claim 5, wherein the tension controller includes a first tension controller that controls the tension of the first wire, a second tension controller that controls the tension of the second wire, a third tension controller that controls the tension of the third wire, and a fourth tension controller that controls the tension of the fourth wire.

9. The apparatus according to claim 5, wherein the belts includes a left above-knee belt to be attached to above a knee of the left leg of the user; and a right above-knee belt to be attached to above a knee of the right leg of the user, wherein the wires include a fifth wire coupled to the waist belt and the right above-knee belt, a sixth wire coupled to the waist belt and the right above-knee belt, a seventh wire coupled to the waist belt and the left above-knee belt, an eighth wire coupled to the waist belt and the left above-knee belt, and wherein the tension controller simultaneously controls a tension of the fifth wire and a tension of the sixth wire on the basis of the user information and the walking information, and wherein the tension controller simultaneously controls a tension of the seventh wire and a tension of the eighth wire on the basis of the user information and the walking information.

10. A control apparatus for an apparatus including belts, wires, and a tension controller, the control apparatus comprising:

a controller; and an obtainer that obtains user information of a user and walking information about a walking action of the user, wherein the belts includes a waist belt to be attached to a waist of the user, a left upper ankle belt to be attached to an upper part of a left ankle of the user, a right upper ankle belt to be attached to an upper part of a right ankle of the user, a left lower ankle belt to be attached to a lower part of the left ankle of the user, and a right lower ankle belt to be attached to a lower part of the right ankle of the user, wherein the wires includes a first wire coupled to the waist belt, the right upper ankle belt, and the right lower ankle belt, a second wire coupled to the waist belt, the right upper ankle belt, and the right lower ankle belt, a third wire coupled to the waist belt, the left upper ankle belt, and the left lower ankle belt, and a fourth wire coupled to the waist belt, the left upper ankle belt, and the left lower ankle belt, wherein the controller causes the tension controller to simultaneously control a tension of the first wire and a tension of the second wire on the basis of the user information and the walking information, and wherein the controller causes the tension controller to simultaneously control a tension of the third wire and a tension of the fourth wire on the basis of the user information and the walking information.

11. The control apparatus according to claim 10, wherein the belts include a left above-knee belt to be attached to above a knee of the left leg of the user, and a right above-knee belt to be attached to above a knee of the right leg of the user, wherein the wires include a fifth wire coupled to the waist belt and the right above-knee belt, a sixth wire coupled to the waist belt and the right above-knee belt, a seventh wire coupled to the waist belt and the left above-knee belt, and an eighth wire coupled to the waist belt and the left above-knee belt, and wherein the controller causes the tension controller to simultaneously control a tension of the fifth wire and a tension of the sixth wire on the basis of the user information and the walking information, and wherein the controller causes the tension controller to simultaneously control a tension of the seventh wire and a tension of the eighth wire on the basis of the user information and the walking information.

12. The control apparatus according to claim 10, wherein the tension controller includes a first tension controller, a second tension controller, a third tension controller, and a fourth tension controller, and the controller causes the first tension controller to control the tension of the first wire, the second tension controller to control the tension of the second wire, the third tension controller to control the tension of the third wire, and the fourth tension controller to control the tension of the fourth wire.

13. A non-transitory computer-readable recording medium storing a control program for causing an apparatus including a processor to perform a process, the apparatus including belts, wires, and a tension controller, the belts being detachably attached to a user, the wires being coupled to the belts, the wires including a first wire to be located along a right side surface of a right ankle of the user, a second wire to be located along a left side surface of the right ankle of the user, a third wire to be located along a right side surface of a left ankle of the user, and a fourth wire to be located along a left side surface of the left ankle of the user, the process including:

obtaining user information of the user and walking information about a walking action of the user;

simultaneously controlling, by the tension controller, a tension of the first wire and a tension of the second wire on the basis of the user information and the walking information; and simultaneously controlling, by the tension controller, a tension of the third wire and a tension of the fourth wire on the basis of the user information and the walking information.

* * * * *